(12) United States Patent
Blessitt et al.

(10) Patent No.: US 10,605,978 B2
(45) Date of Patent: Mar. 31, 2020

(54) EDGELIT RECESSED LUMINAIRE

(71) Applicant: Cooper Technologies Company, Houston, TX (US)

(72) Inventors: James H. Blessitt, Peachtree City, GA (US); Phillip Kim Sou, Atlanta, GA (US); Grzegorz Wronski, Peachtree City, GA (US)

(73) Assignee: Eaton Intelligent Power Limited, Dublin (IE)

(*) Notice: Subject to any disclaimer, the term of this patent is extended or adjusted under 35 U.S.C. 154(b) by 63 days.

(21) Appl. No.: 15/847,698

(22) Filed: Dec. 19, 2017

(65) Prior Publication Data

US 2018/0172898 A1 Jun. 21, 2018

Related U.S. Application Data

(60) Provisional application No. 62/436,719, filed on Dec. 20, 2016.

(51) Int. Cl.
| | |
|---|---|
| *F21V 8/00* | (2006.01) |
| *F21S 8/02* | (2006.01) |
| *F21V 21/005* | (2006.01) |
| *F21V 21/088* | (2006.01) |
| *F21V 17/16* | (2006.01) |
| *F21V 3/00* | (2015.01) |
| *F21Y 115/10* | (2016.01) |
| *F21Y 103/10* | (2016.01) |
| *F21V 23/04* | (2006.01) |

(52) U.S. Cl.
CPC ............ *G02B 6/0068* (2013.01); *F21S 8/026* (2013.01); *F21V 21/005* (2013.01); *F21V 21/088* (2013.01); *G02B 6/0085* (2013.01); *G02B 6/0088* (2013.01); *G02B 6/0091* (2013.01); *F21V 3/00* (2013.01); *F21V 17/162* (2013.01); *F21V 23/0471* (2013.01); *F21Y 2103/10* (2016.08); *F21Y 2115/10* (2016.08)

(58) Field of Classification Search
CPC .. G02B 6/0068; G02B 6/0088; G02B 6/0085; G02B 6/0091; F21V 21/005; F21V 21/088; F21V 23/0471; F21V 3/00; F21V 17/162; F21S 8/026; F21Y 2103/10; F21Y 2115/10
See application file for complete search history.

(56) References Cited

U.S. PATENT DOCUMENTS

| | | | |
|---|---|---|---|
| 9,618,678 B1* | 4/2017 | Tickner ................ | G02B 6/0085 |
| 2015/0338084 A1* | 11/2015 | Ryder ................... | F21V 31/005 |
| | | | 362/606 |

* cited by examiner

*Primary Examiner* — David V Bruce
(74) *Attorney, Agent, or Firm* — King & Spalding LLP

(57) ABSTRACT

An edgelit recessed luminaire includes a housing that defines an inner cavity and has a pair of side panels. Each side panel includes one or more torsion spring receivers. Further, the edgelit recessed luminaire includes a light engine that includes torsion springs that are pivotally coupled to the light engine via torsion spring brackets. The light engine is removably coupled to the housing such that in an open position, the light engine is suspended from the housing via the torsion springs providing access to the inner cavity and in a closed position, the light engine covers the inner cavity of the housing. Alternatively, a linear light module is removably coupled to the housing.

20 Claims, 40 Drawing Sheets

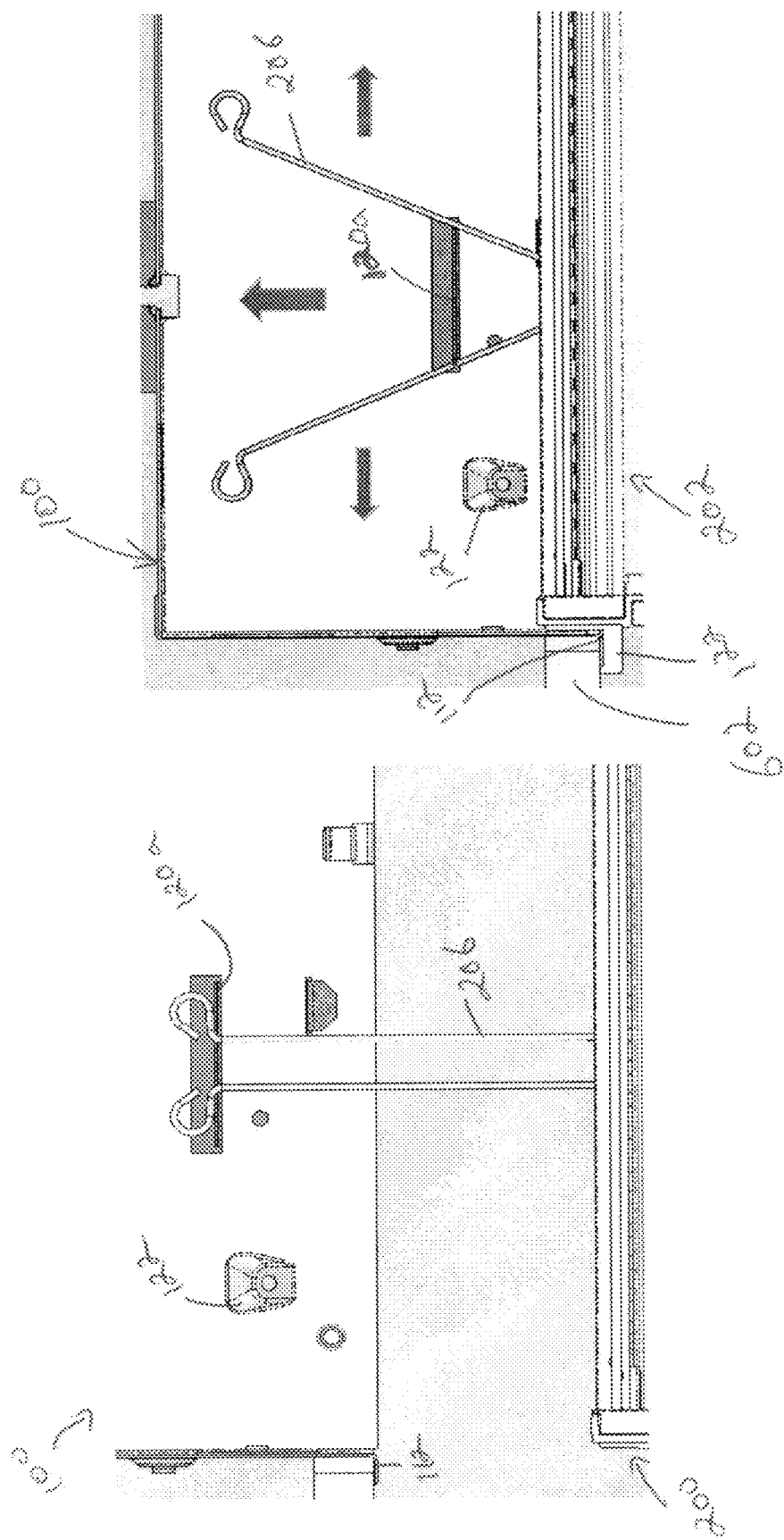

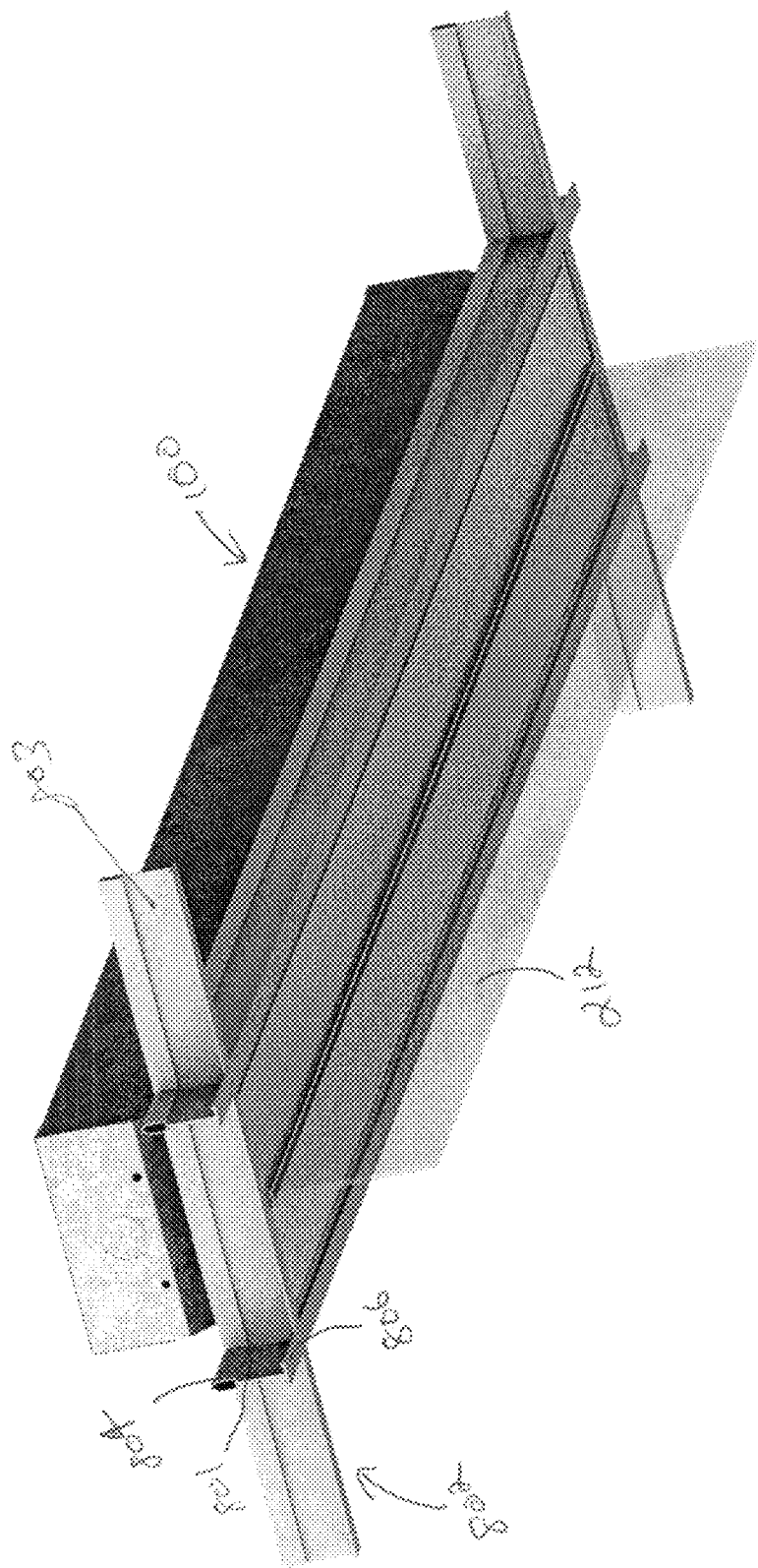

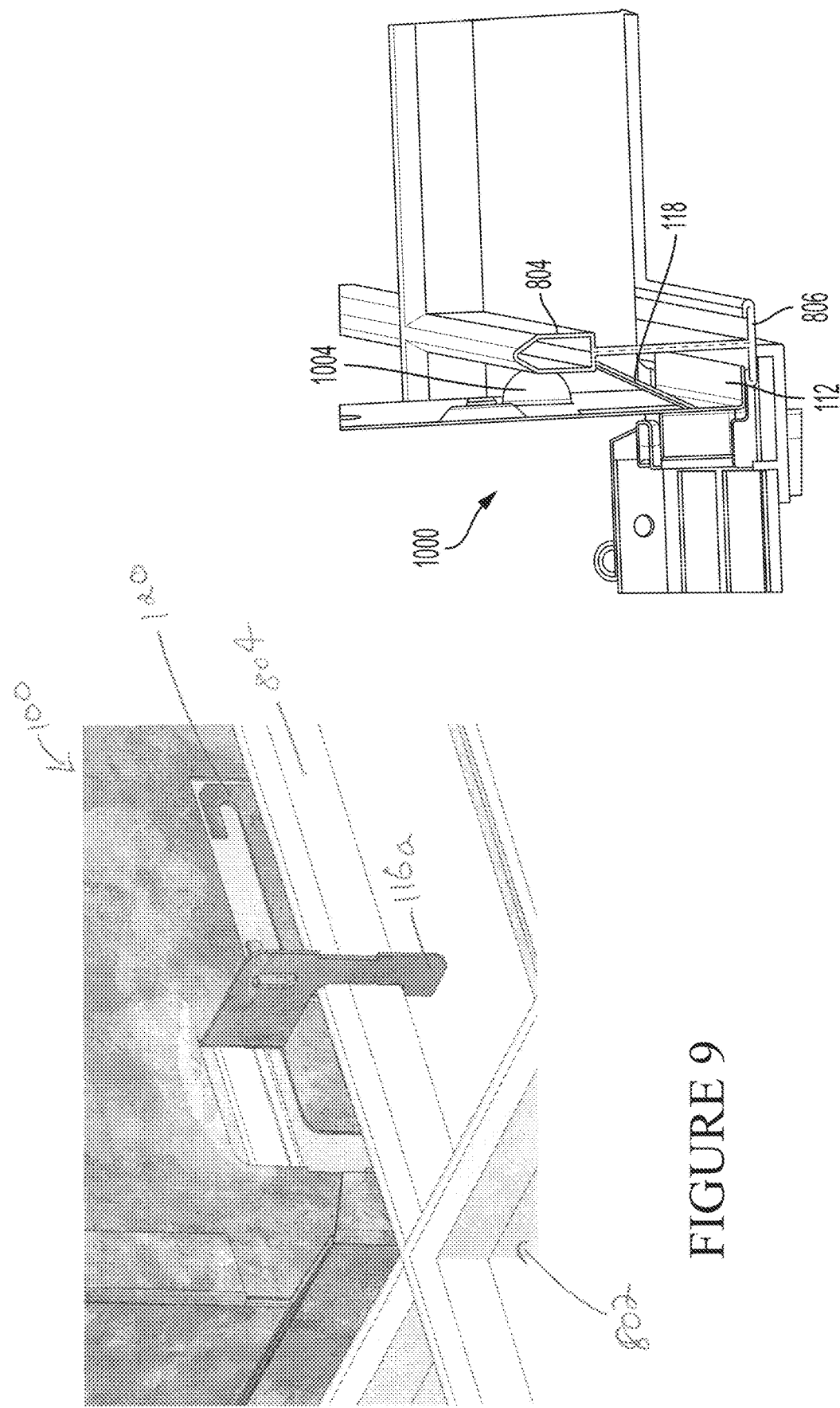

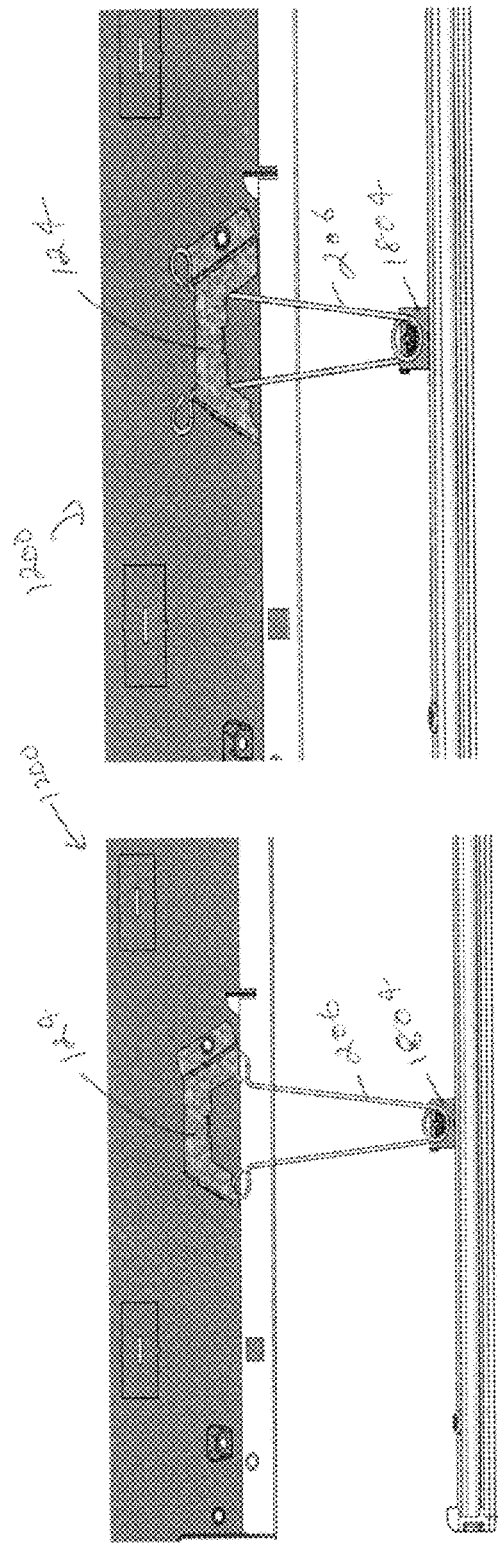
FIGURE 26
FIGURE 25
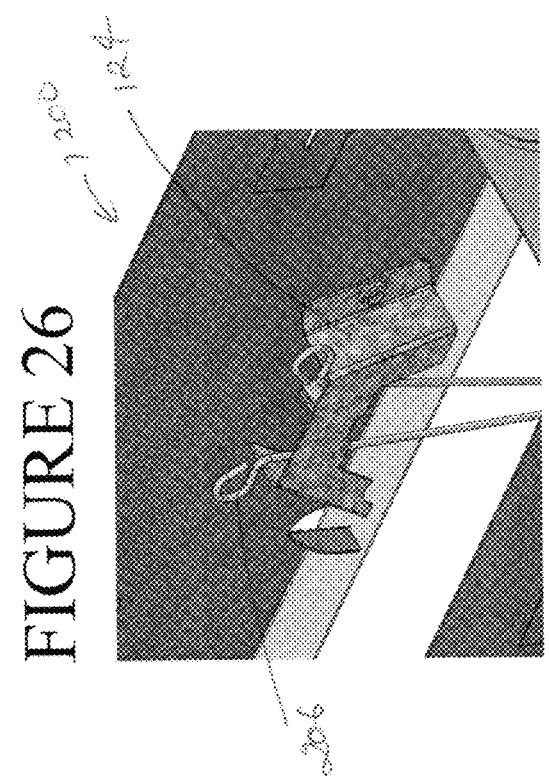
FIGURE 27
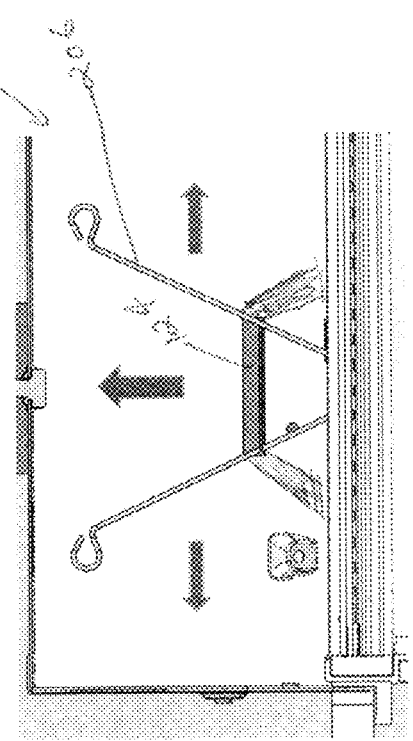
FIGURE 28

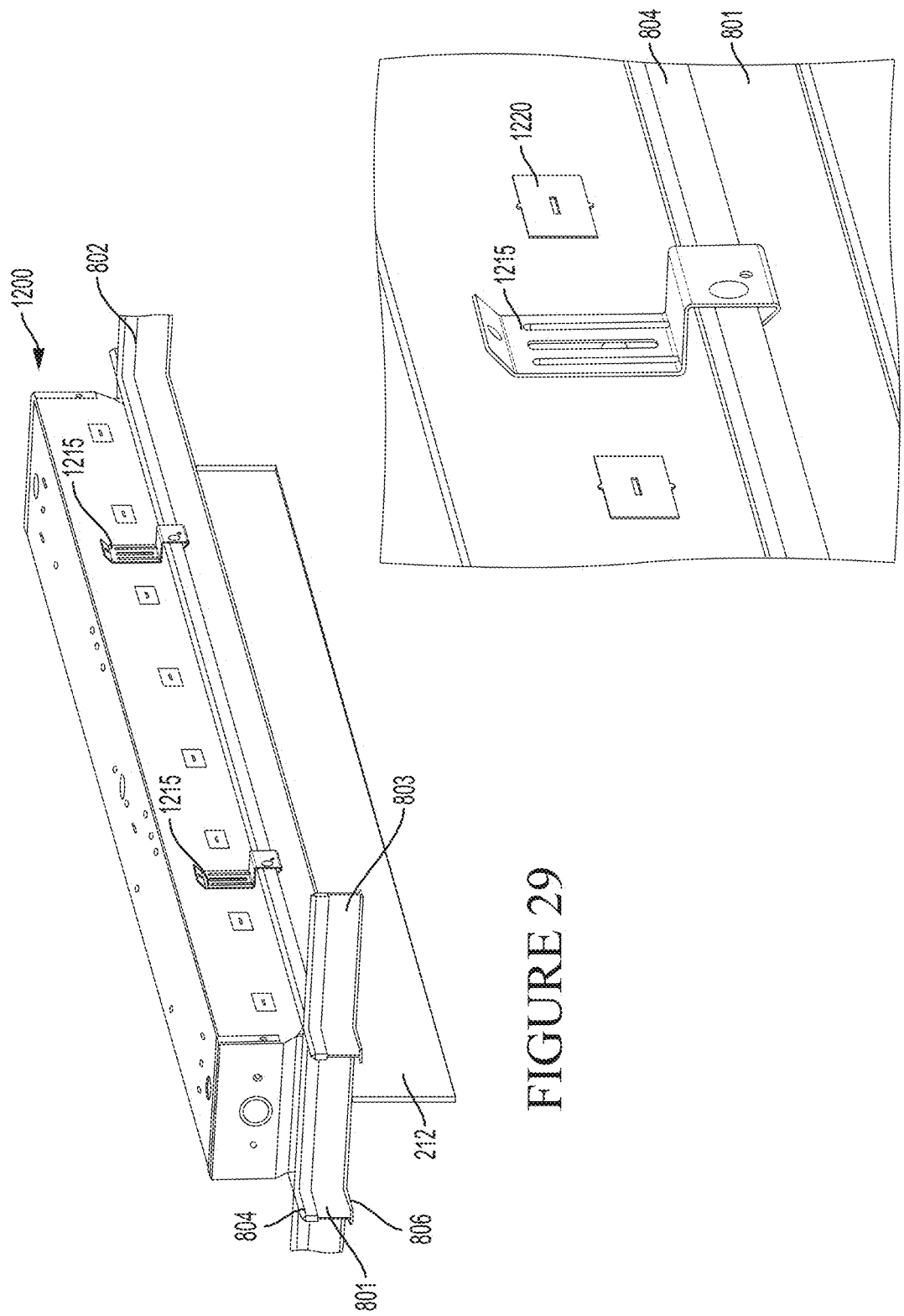

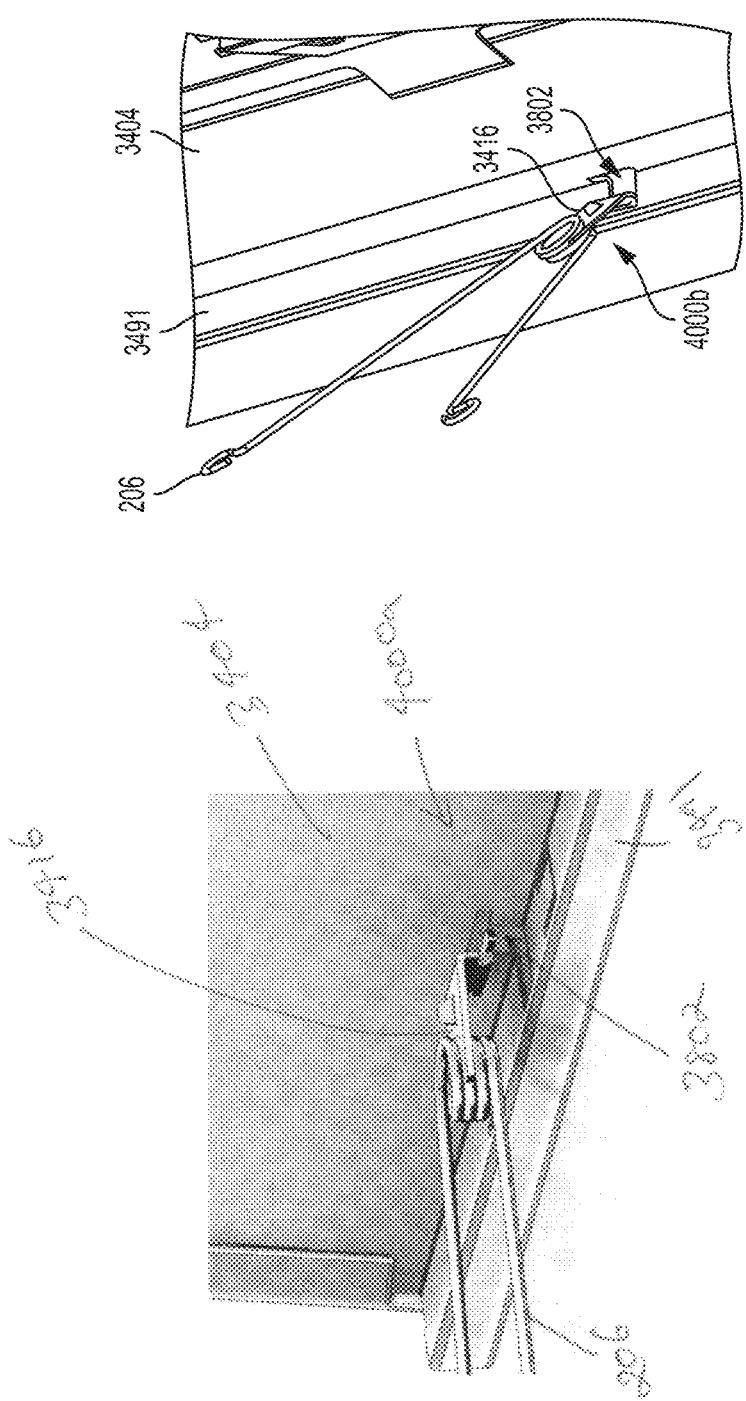

EDGELIT RECESSED LUMINAIRE

CROSS-REFERENCE TO RELATED APPLICATIONS

The present application claims priority under 35 U.S.C. § 119(e) to U.S. Provisional Patent Application No. 62/436,719 titled "Edgelit Recessed Luminaire," and filed on Dec. 20, 2016. The entire contents of the foregoing application are hereby incorporated herein by reference.

TECHNICAL FIELD

Embodiments of the present disclosure relate generally to light fixtures, and more particularly to an edgelit recessed luminaire.

BACKGROUND

Recent advancements in lighting technology have led to the replacement of traditional lighting sources with light emitting diodes (LEDs) in many lighting applications. LEDs hold several advantages over traditional lighting sources, such as increased power efficiency, size to output efficiency, lifespan, and so on. Thus, many lighting fixtures are being redesigned to use LEDs instead of the traditional lighting sources.

One type of LED lighting technology is edgelit lighting. Edgelit lighting solutions typically include a strip of LEDs and an acrylic lens or waveguide disposed adjacent the LED strip such that the LEDs emit light into the waveguide through an edge of the waveguide. The light then emanates from the surfaces of the waveguide. In some applications, the surfaces of the waveguide include etchings or other features to manipulate the light.

Edgelit light fixtures that are configured for recessed mounting may exist. However, current edgelit recessed lighting technology may not be modular. That is, current edgelit recessed light fixtures may be provided to a user as a whole light fixture, e.g., a combination of a housing and a light engine, that is placed in a grid system or drywall as one piece using flange kits and other mounting accessories. Said light fixtures of the current technology are not modular, i.e., (a) the housing of said light fixtures is not configured to hold any other type of light engines than the one that comes attached to the housing, and/or (b) the light fixtures are not configured for coupling with other light fixtures for continuous row mount installations. This non-modularity limits the flexibility and use/application of said light fixtures.

Further, said light fixtures of the current technology are typically provided with a louver/door assembly that is fastened to the housing of the light fixtures to conceal the wiring and/or electronic components disposed in the housing. For maintenance operations, the user may have to unfasten the louver/door assembly to gain access to the electronic components and/or the wiring disposed in the interior of the light fixture. This may be inconvenient for the user considering that the light fixtures may be mounted up in the ceiling and that the user may have to perform said unfastening operation while balancing on a ladder which increases the user's risk of falling and getting injured. Further, said process of having to unfasten the louver/door assembly to access the electronic components and/or wiring disposed in the housing may be time-consuming for the user. Therefore, there exists a need for technology that overcomes the above mentioned deficiencies of current edgelit recessed lighting technology.

SUMMARY

In one aspect, the present disclosure is related to an edgelit recessed luminaire that includes a housing that defines an inner cavity and has a pair of side panels. Each side panel comprises one or more torsion spring receivers. Further, the edgelit recessed luminaire includes a light engine that is removably coupled to the housing. The light engine includes a heat sink assembly that defines a light source cavity and a waveguide cavity. Further, the light engine includes a plurality of light emitting diodes (LEDs) disposed in the light source cavity. Furthermore, the light engine includes a waveguide that is disposed in the waveguide cavity such that light from the plurality of LEDs enters an edge of the waveguide and exits through major surfaces of the waveguide. The light engine also includes a plurality of torsion springs that are coupled to the heat sink assembly of the light guide via torsion spring brackets. The light engine is removably coupled to the housing using the torsion springs such that in an open position, the light engine is suspended from the housing via the torsion springs providing access to the inner cavity and in a closed position, the light engine covers the inner cavity of the housing.

In another aspect, the present disclosure is related to an edgelit recessed luminaire that includes a housing that defines an inner cavity and has a pair of side panels. Each side panel comprises a plurality of torsion spring receivers. Further, the edgelit recessed luminaire includes a linear light module that is removably coupled to the housing. The linear light module includes a secondary housing that defines a cavity with an open side, a plurality of light emitting diodes (LEDs) disposed in the cavity defined by the secondary housing, a lens coupled to the secondary housing and disposed over the plurality of LEDs such that it covers the open side of the cavity defined by the secondary housing and such that light emitted by the plurality of LEDs passes through the lens towards an illumination area, and a plurality of torsion springs that are coupled to the secondary housing via torsion spring clips. The torsion spring clips are rotatably coupled to the secondary housing. The linear light module is removably coupled to the housing using the torsion springs such that in an open position, the light engine is suspended from the housing via the torsion springs providing access to the inner cavity defined by the housing and in a closed position, the light engine covers the inner cavity defined by the housing.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein:

FIGS. 6A and 6B (collectively 'FIG. 6') illustrate how the light engine is coupled to the housing using a quick connect and disconnect method, in accordance with example embodiments of the present disclosure;

FIGS. 8A and 8B (collectively 'FIG. 8') illustrate top and bottom perspective views, respectively, of the edgelit recessed luminaire installed in a T-grid ceiling, in accordance with example embodiments of the present disclosure;

FIG. 9 illustrates how the housing of the edgelit recessed luminaire is locked to the T-grid frame in the T-grid ceiling using a locking tab component, in accordance with example embodiments of the present disclosure;

FIG. 10 illustrates an alternative method of locking another example housing of the edgelit recessed luminaire to the T-grid frame in the T-grid ceiling using a locking tab of the other example housing, in accordance with example embodiments of the present disclosure;

FIGS. 25-26 and 28 illustrate how the light engine of FIG. 18 is coupled to the housing of FIGS. 12 and 13 using a quick connect and disconnect method, in accordance with example embodiments of the present disclosure;

FIG. 27 illustrates an enlarged view of a top portion of a heavy duty spring receiver in the housing of FIGS. 12 and 13 with the torsion spring coupled to the heavy duty spring receiver, in accordance with example embodiments of the present disclosure;

FIG. 29 illustrates a perspective view of the edgelit recessed luminaire of FIG. 23 installed in the T-grid ceiling using earthquake clips, in accordance with example embodiments of the present disclosure;

FIG. 30 illustrates an enlarged view of a portion of the edgelit recessed luminaire installed in the T-grid ceiling using earthquake clips, in accordance with example embodiments of the present disclosure;

FIGS. 40 and 41 illustrate how the torsion springs are rotatably coupled to the linear light module using swivel clips, in accordance with example embodiments of the present disclosure;

Figure 1A:
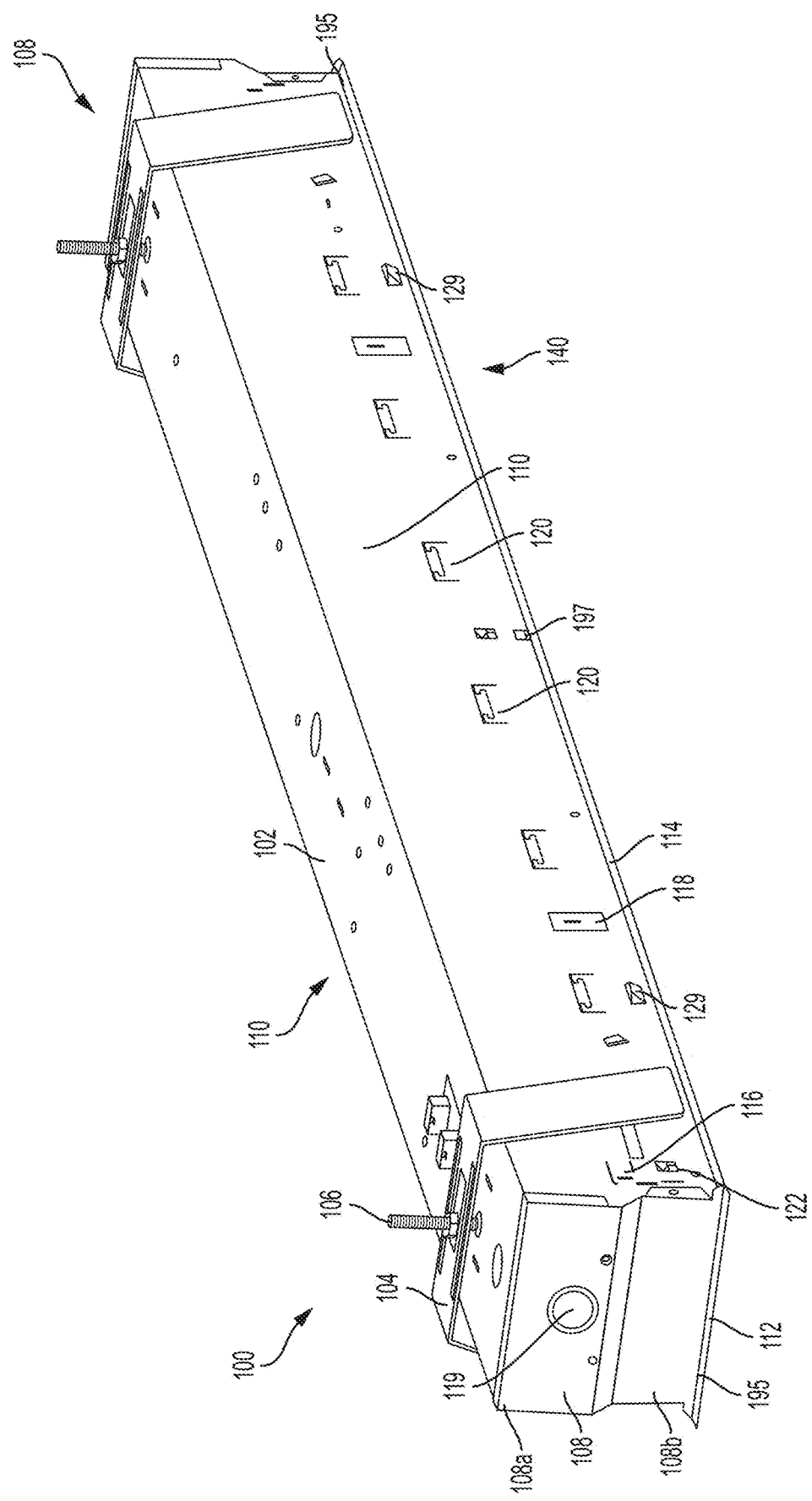
FIGS. 1A and 1B (collectively 'FIG. 1') illustrate top and bottom perspective views, respectively, of a housing of an edgelit recessed luminaire, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION

The present disclosure describes an edgelit recessed luminaire that comprises a housing and a light engine that is configured to be coupled to the housing using torsion springs. The housing is designed to fit standard T-grid ceilings, new construction drywall ceilings, and/or retrofit existing (old) construction drywall ceilings. In particular, the housing includes removable flanges that are removed for installing the housing in new construction drywalls. For example, in new construction, the flanges of the housing may be removed to allow rough-in installation where the drywall will be installed. Further, the housing includes a drywall clamping kit that is configured to install the housing in an existing drywall ceiling without the need for structural supports.

Furthermore, the housing includes either a plurality of torsion spring receivers that are integral to the housing or torsion spring receiver locations that are configured to receive one or more modular torsion spring receivers. The torsion spring receivers (modular or integral) may receive torsion springs that are coupled to a light engine or a linear light module for removably coupling the light engine or linear light module to the housing. To couple the light engine or linear light module to the housing, the torsion springs of the light engine or linear light module may be attached to the torsion spring receivers on the housing such that the light engine or linear light module suspends from the housing thereby freeing the hands of the installer to make electrical connections, if needed. Then, the light engine or linear light module is pushed up towards the housing to close access to the housing. When a user wants to access the electronic components or wiring disposed in the housing, the user can pull the light engine or the linear light module down such that the light engine suspends from the housing via the torsion springs. Alternatively, the light engine or the linear light module may be removed from the housing by uncoupling the torsion springs from the torsion spring receivers of the housing. The torsion spring coupling mechanism allows quick connect and disconnect of the light engine or linear light module from the housing, thereby making installation easier, efficient, and less time consuming compared to current edgelit recessed lighting technology. Additionally, the housing includes end plates that are designed to allow continuous row mounting, i.e., end to end arrangement of more than one edgelit recessed luminaire.

Figure 1B:
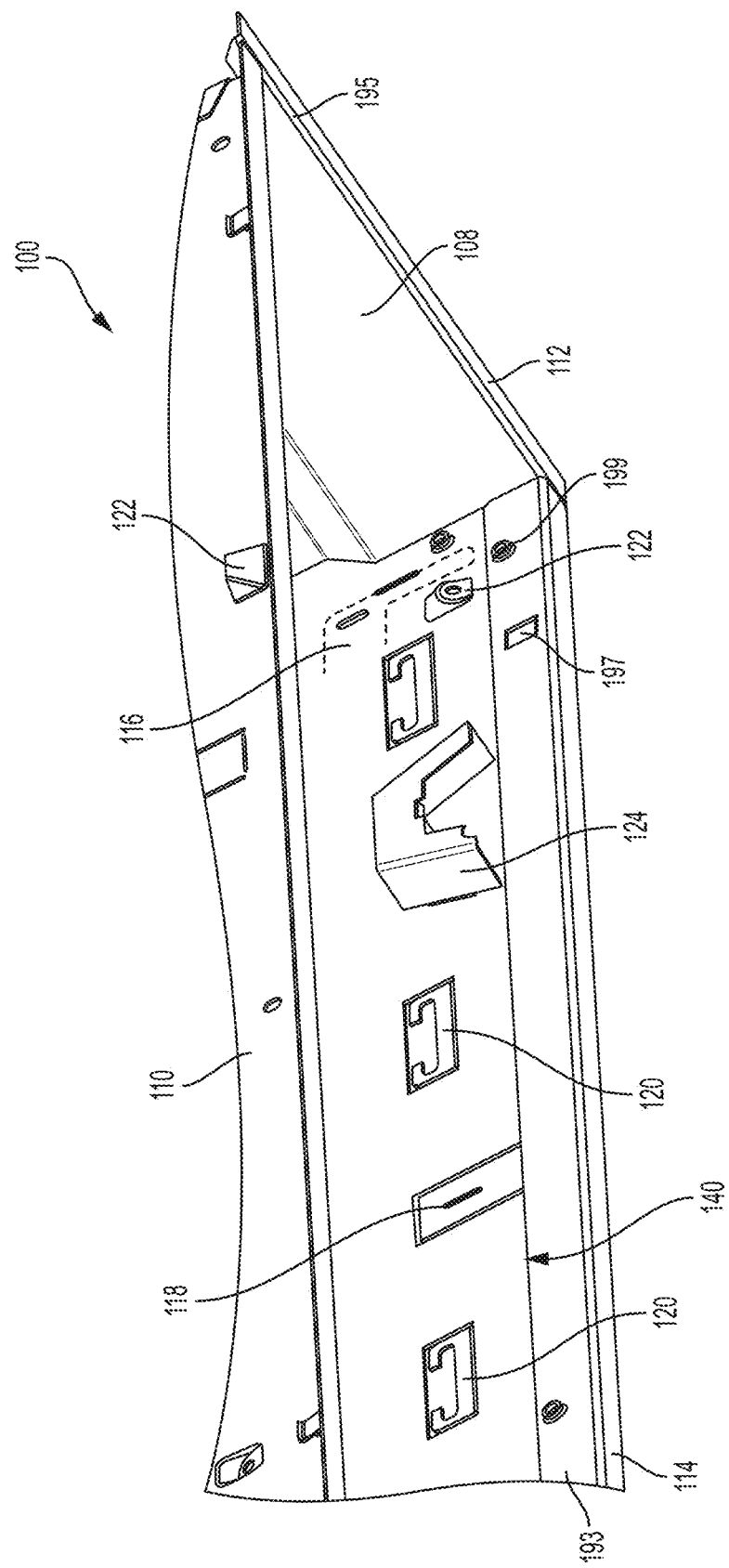
Figure 2A:
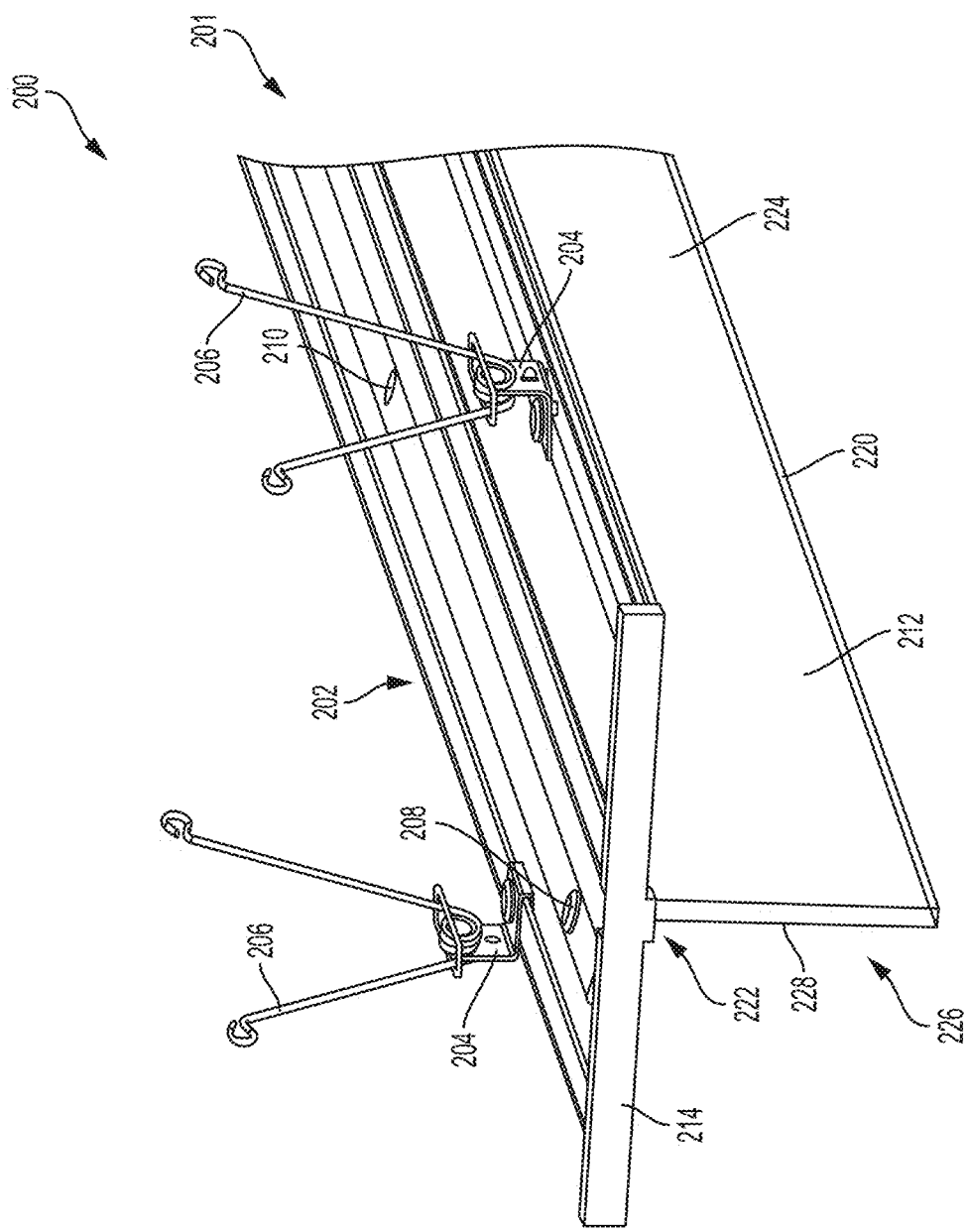
FIG. 2A illustrates a perspective view of a portion of a light engine of the edgelit recessed luminaire with a heat sink end cap, in accordance with example embodiments of the present disclosure.
Figure 2B:
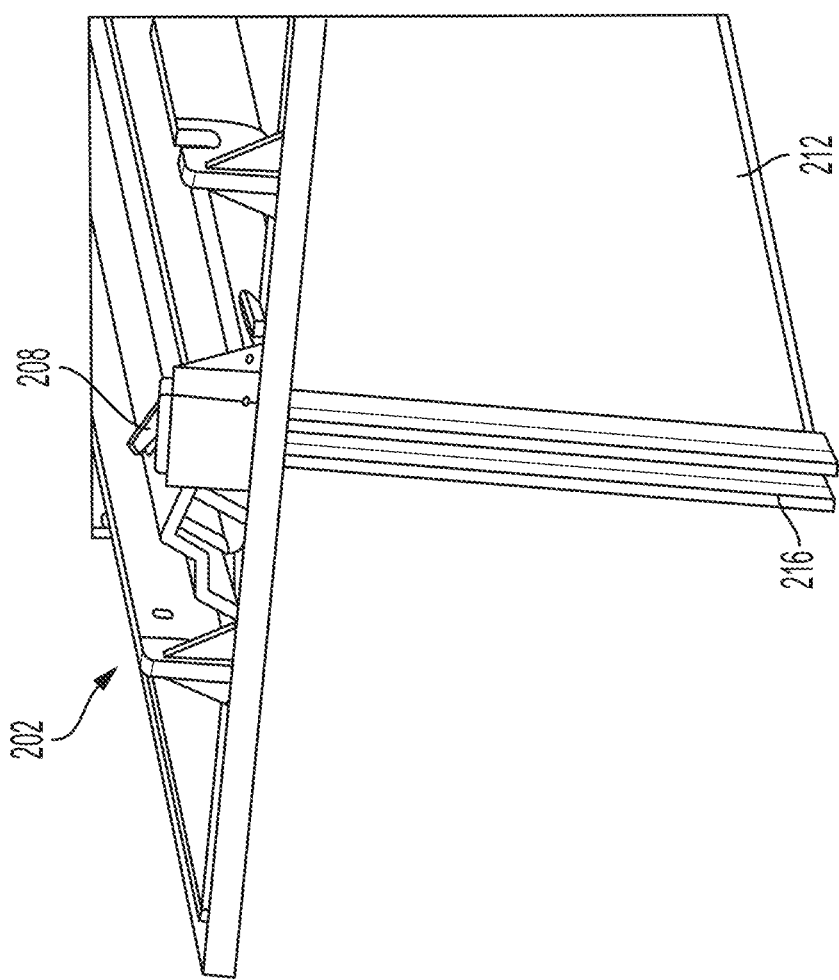
FIG. 2B illustrates another perspective view of a portion of another example light engine of the edgelit recessed luminaire with a waveguide end cap, in accordance with example embodiments of the present disclosure.
Figure 3:
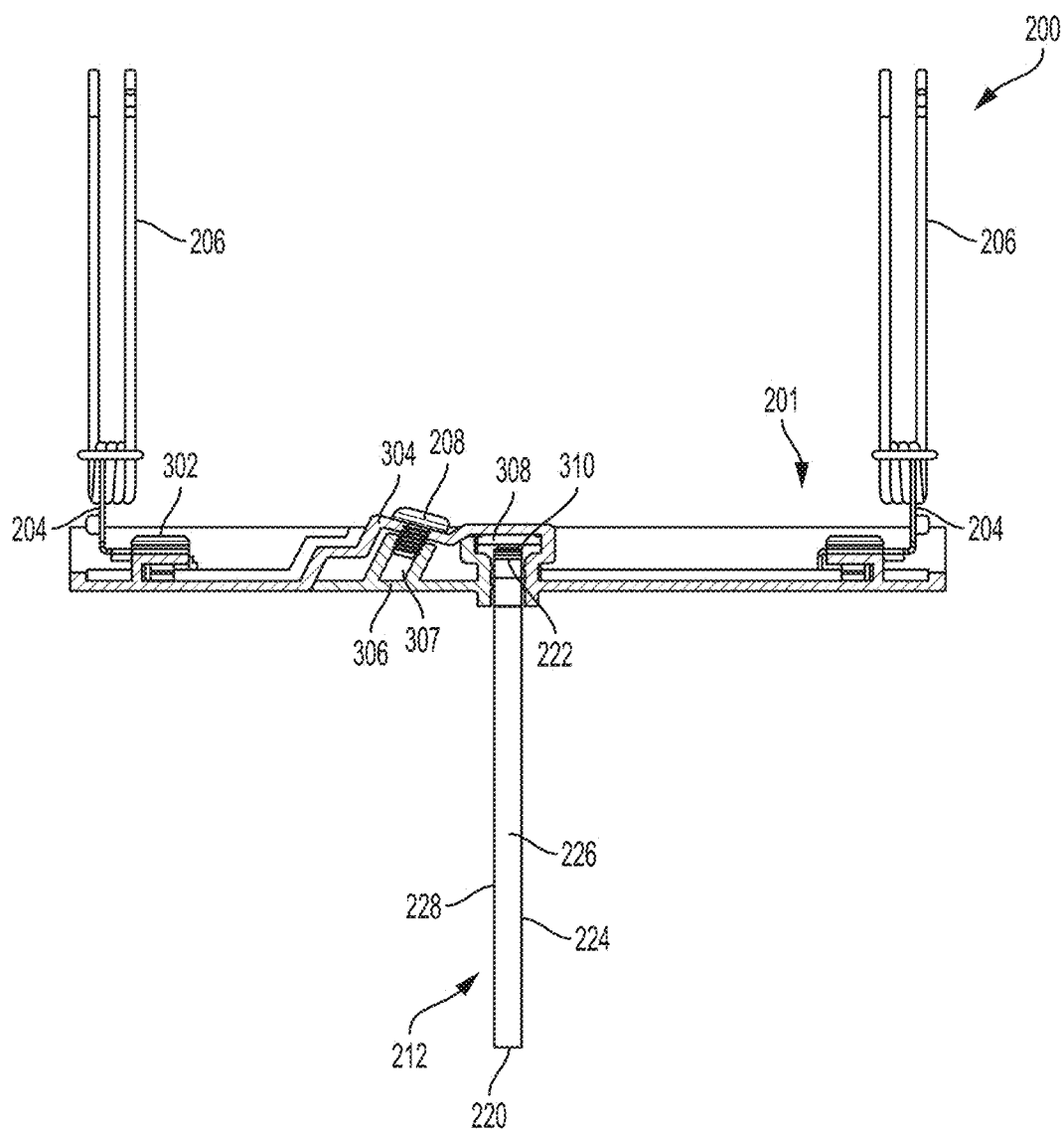
FIG. 3 illustrates a cross-section view of the light engine of FIG. 2A without the end cap on one lateral side of the light engine, in accordance with example embodiments of the present disclosure.
Figure 4:
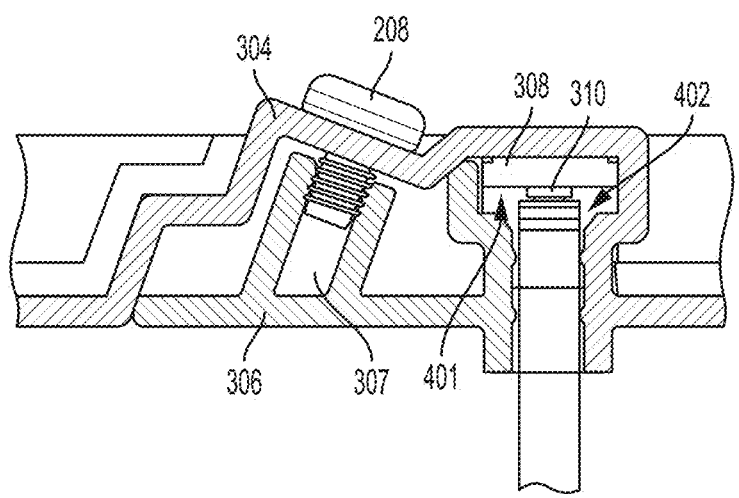
FIG. 4 illustrates an enlarged view of a portion of the light engine that shows an arrangement of a heat sink assembly with a waveguide of the light engine illustrated in FIG. 2A, in accordance with example embodiments of the present disclosure.
Figure 5:
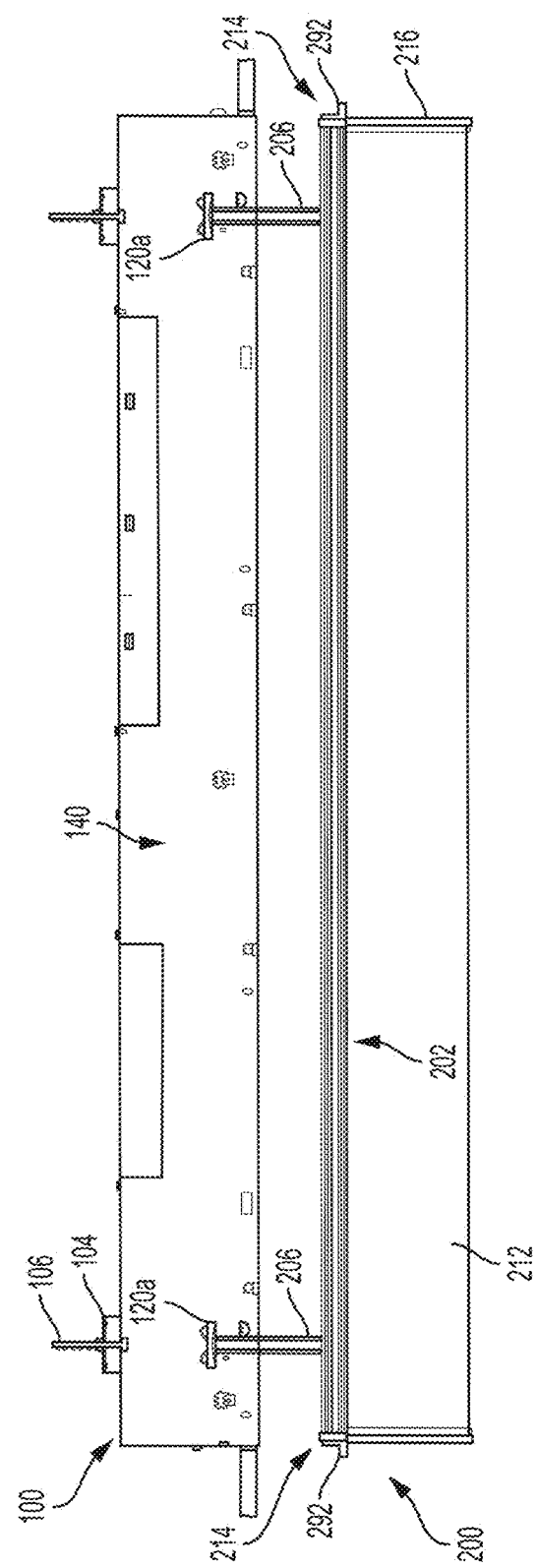
FIG. 5 illustrates a cross-section view of the edgelit recessed luminaire with the torsion springs in an open position supporting the light engine in the housing, in accordance with example embodiments of the present disclosure.
Figure 7A:
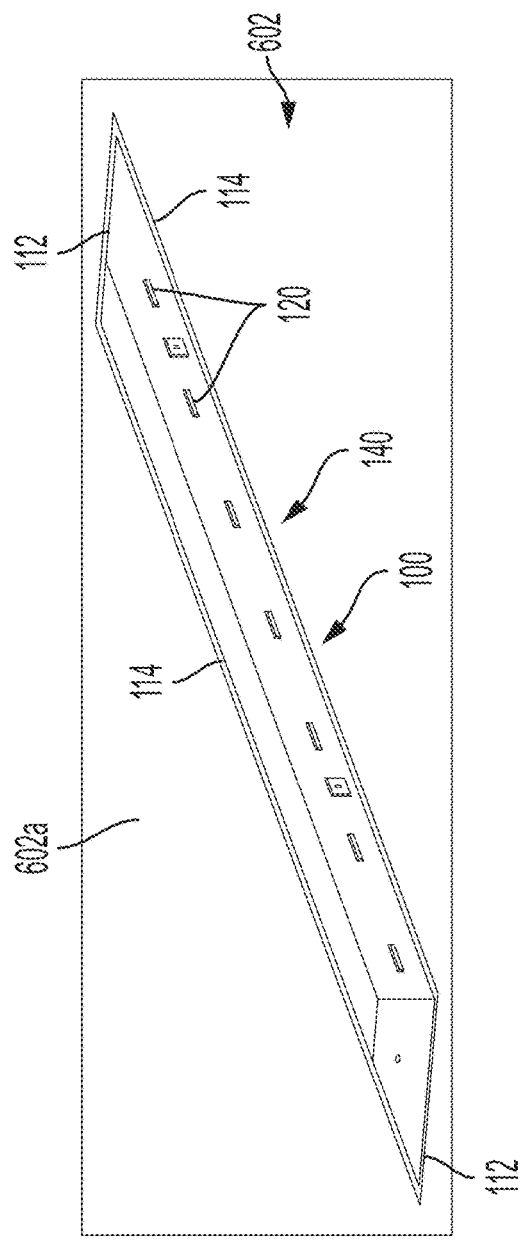
FIGS. 7A and 7B (collectively 'FIG. 7') illustrate bottom and top perspective views, respectively, of the housing installed in an existing construction drywall, in accordance with example embodiments of the present disclosure.
Figure 7B:
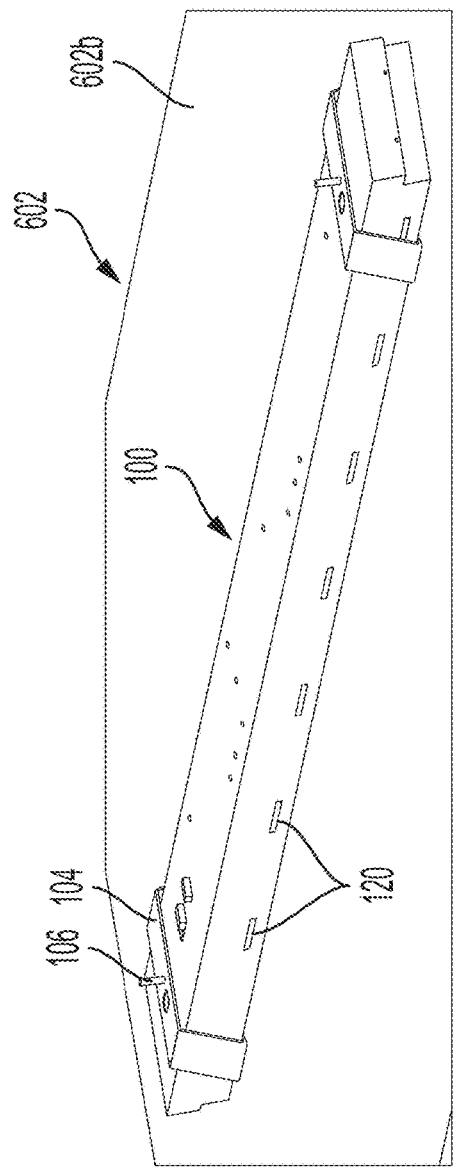
Figure 11A:
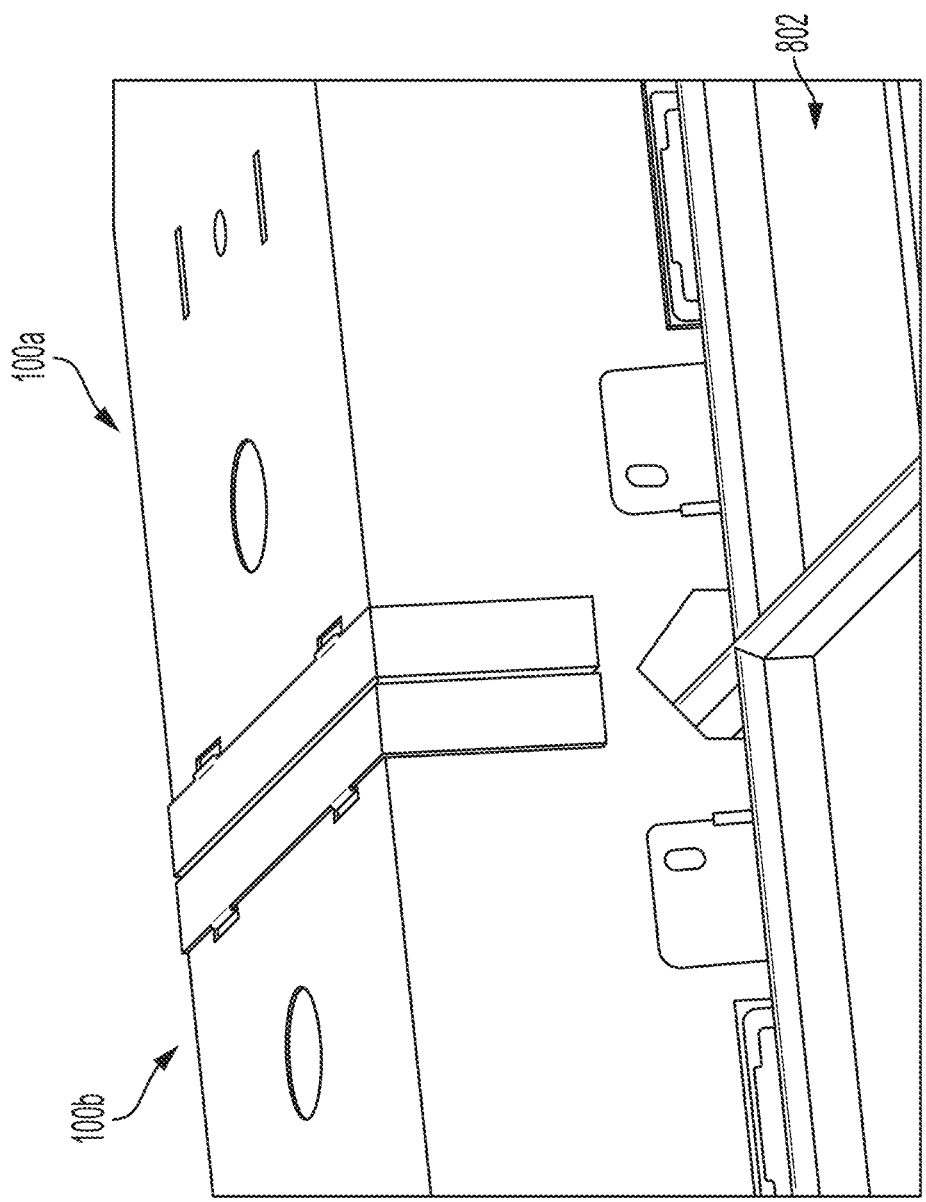
FIGS. 11A and 11B (collectively 'FIG. 11') illustrate top and bottom perspective views, respectively, of two edgelit recessed luminaires that are row mounted in the T-grid ceiling, in accordance with example embodiments of the present disclosure.
Figure 11B:
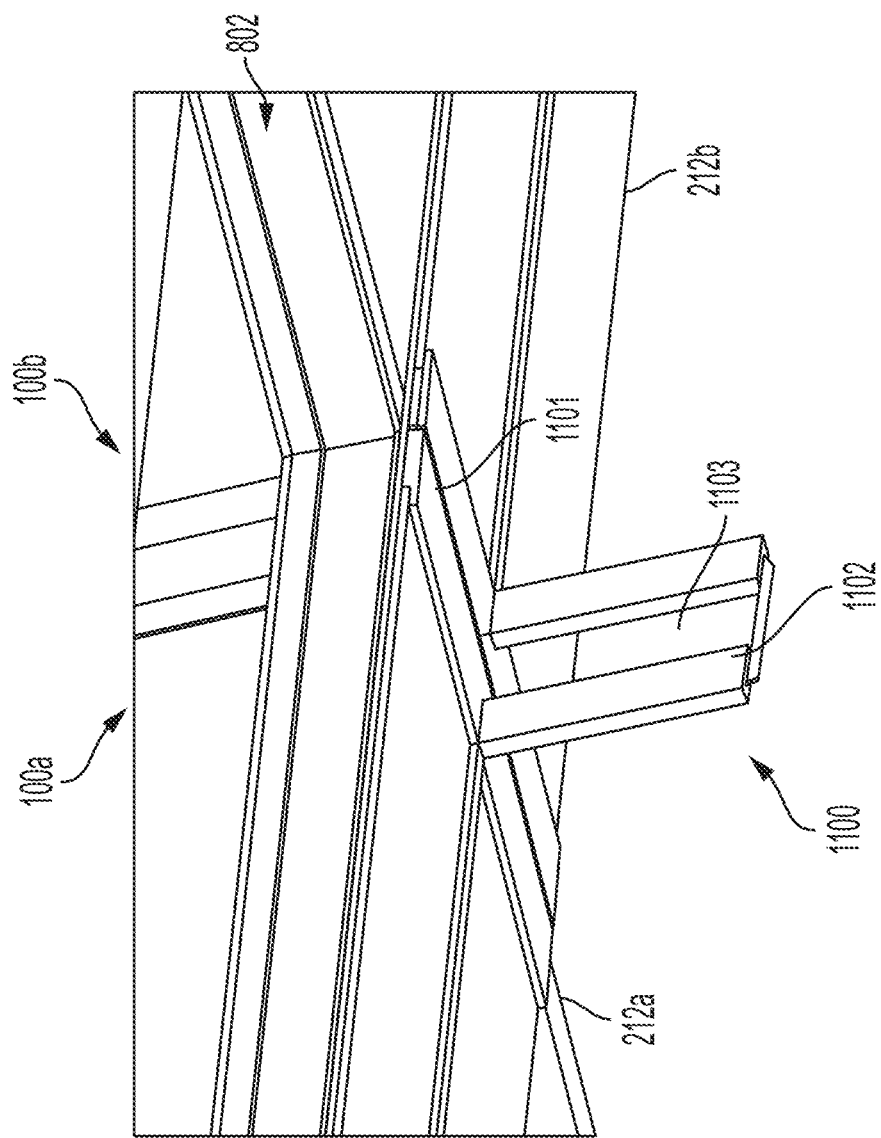

Edgelit Recessed Luminaires with Housing Having Stamped in Torsion Spring Receivers and Locking Tabs Moving now to discuss the figures, FIGS. 1A and 1B illustrate the housing; FIGS. 2A and 2B (collectively "FIG. 2"), and FIGS. 3 and 4 illustrate the light engine; FIGS. 5-6 illustrate the quick connect and disconnect mechanism for coupling the light engine to the housing; FIGS. 7A and 7B illustrate installation of the housing in an existing drywall ceiling; FIGS. 8-10 illustrate installation of the edgelit recessed luminaire in a T-grid ceiling; and FIGS. 11A and 11B illustrate a row mounting embodiment of the edgelit recessed luminaire.

FIGS. 1A and 1B (collectively 'FIG. 1') illustrate top and bottom perspective views of a housing of an edgelit recessed luminaire, respectively, in accordance with example embodiments of the present disclosure. Referring to FIG. 1, the housing 100 may have a substantially U-shaped cross-sectional profile defined by a rectangular shaped top surface 102 and two longitudinal side panels 110 (herein 'side panel') extending substantially perpendicular to the top surface 102 from the long edges of the top surface 102. Further, the housing 100 may include two end panels 108 that are coupled to and cover opposite ends of the housing 100. The top surface 102, the side panels 110, and the end panels 108 are arranged such that they define an inner cavity 140 that is open on one side (i.e., the side opposite to the top surface 102). The inner cavity 140 of the housing 100 may be configured to house one or more electronic components and/or wiring associated with the edgelit recessed luminaire.

It is noted that the top surface 102, the side panels 110, and the end panels 108 can have any other appropriate shape than that illustrated in FIGS. 1, 6-8, and 11 without departing from a broader scope of the present disclosure. Further, one of ordinary skill in the art can understand and appreciate that the housing may be configured to have cross-sections of any other appropriate geometric or non-geometric shape without departing from a broader scope of the present disclosure.

As illustrated in FIG. 1, the housing 100 may include side flanges 114 that are removably coupled to the housing 100 using fasteners, such as rivets 199. In particular, the side flanges 114 may have a collar 193, and the collar 193 may have stop tabs 197 that engage corresponding notches adjacent the bottom edge 195 of the housing 100 to prevent an over insertion of the side flanges 114 into the housing 100. Further, the end panels 108 may have end flanges 112 that are integral to the end panels 108. Even though the present disclosure describes the flange as being removably coupled, one of ordinary skill in the art can understand and appreciate that in some example embodiments, the flange can be fixedly coupled to the housing without departing from a broader scope of the present disclosure.

As illustrated in FIG. 1, the side flanges 114 are coupled to the housing 100 such that the side flanges 114 extend radially outward from and substantially perpendicular to the bottom edges of the two side panels 110. In other words, the removable side flanges 114 are disposed at the bottom edge 195 of the housing 100 that defines the open side of the housing 100 opposite to the top surface 102.

In certain example embodiments, the side flanges 114 may be configured to securely mount the housing 100 in a T-grid frame 802 of a T-grid ceiling as illustrated in FIGS. 8-10 and described below in greater detail in association with FIGS. 8-10. In other example embodiments, such as in existing drywall ceiling installations, the side flanges 114 may be configured to operate as a stop mechanism that prevents the housing 100 from being pushed further into the ceiling during installation, e.g., when the side flanges 114 engage a ceiling (drywall). In some example embodiments, the side flanges 114 may be detached from the housing 100. For example, in new drywall installations, the side flanges 114 may be detached from the housing 100 and the drywall may be aligned with the bottom edge 195 of the housing 100 using the position embossments 129 such that the housing 100 is flush mounted with the ceiling. In another example, the side flanges 114 may be detached from the housing 100 to allow a rough-in installation of the housing 100 where the drywall will be installed, i.e., prior to the drywall installation.

In addition to the side flanges 114, the housing 100 may include one or more wedge shaped mounting features 122 disposed adjacent the lateral ends of the side panels 110. The wedge shaped mounting features 122 may protrude inwards from the side panels 110 towards the inner cavity 140 of the housing and may be configured to directly fasten (e.g., screw) the housing 100 to rafters or joists in the ceiling, for example, in new construction installations.

Furthermore, as illustrated in FIG. 1, the housing 100 may include a pair of drywall clamps 104 that are removably coupled to the top surface 102 of the housing 100 using a fastener 106, such as a jack bolt. The drywall clamps 104 may be configured for retrofitting the housing 100 in old construction drywall ceilings 602 (existing drywall) shown in FIG. 7. In particular, the drywall clamps 104 may not be part of the housing 100 and may be provided separately for coupling with the housing 100 for when the housing 100 is to be installed in existing drywall ceilings 602.

To mount the housing in existing drywall ceilings 602 using the drywall clamps 104, the housing 100 with the drywall clamps 104 attached thereto is pushed through an opening (existing or newly cut out) in the drywall ceiling 602: (a) till the side flanges 114 of the housing 100 engage a bottom surface 602a of the drywall ceiling 602, and (b) the drywall clamps 104 engage a top surface 602b of the drywall ceiling 602 to securely couple the housing 100 to the drywall 602 by clamping the drywall ceiling 602 between the drywall clamps 104 and the side flanges 114 as illustrated in FIGS. 7A and 7B. Then, the fastener 106 may be adjusted to tighten or loosen the grip of the drywall clamps 104 on the drywall ceiling.

As illustrated in FIGS. 1, 7, 8A, 9, and 11A, the housing 100 may further include one or more locking tabs (116, 118) and torsion spring receivers 120 that are disposed on the side panels 110 of the housing 100. In other example embodiments, the locking tabs (116, 118) and the torsion spring receivers 120 may be located on any other surface of the housing 100 without departing from a broader scope of the present disclosure. For example, as illustrated in FIG. 10, the locking tabs 118 may be disposed on the end panels 108 of the housing 1000.

In particular, the one or more locking tabs (116, 118) and torsion spring receivers 120 may be stamped into and partially attached to each side panel 110 such that the one or more locking tabs (116, 118) and torsion spring receivers 120 can be pushed and bent out towards either side of the side panel 110 by applying pressure on them (using a user's fingers).

The one or more locking tabs (116, 118) may be configured to lock the housing 100 to a T-grid frame 802 when the housing 100 is installed in a T-grid ceiling as illustrated in FIGS. 9 and 10. In particular, as illustrated in FIG. 9, the locking tabs 116 may be pushed and bent outwards such that they are substantially perpendicular to the side panel 110. Further, the locking tabs 116 may be configured to engage or latch onto a top portion 804 of T-grid frame's main member 801 as illustrated in FIG. 9. Alternatively, the locking tabs 116 may be configured to engage or latch onto the top portion 804 of T-grid frame's cross member 803 in a different arrangement or in an embodiment where the locking tabs 116 are disposed on the end panels 108 of the housing 100. Furthermore, the locking tabs 118 may also be configured to engage a top portion 804 of T-grid frame's main member 801 or cross member 803 as illustrated in FIG. 10. As described above. FIG. 10 illustrates another example embodiment of the housing 1000 where the locking tabs 118 are disposed on the end panel 108 of the housing 1000 along with other alignment/spacing tabs 1004 that locate the housing 1000 at a proper orientation to the T-grid frame 802. In either arrangement, the locking tabs (116, 118) lock the housing 100 to the T-grid frame 802.

As illustrated in FIGS. 5 and 6, the one or more torsion spring receivers 120 may be configured to removably couple a light engine 200 (shown in FIGS. 2-6) to the housing 100 using torsion springs 206 (shown in FIGS. 2, 3, 5, and 6) that are coupled to the light engine 200. In addition to the torsion spring receivers 120 that are stamped into the side panels 110, the housing 100 may include one or more heavy duty (HD) spring receivers 124 that are coupled to the side panel 110 of the housing 100 as illustrated in FIG. 1B. Similar to the torsion spring receivers 120, the HD spring receivers 124 may also be configured to removably couple a light engine to the housing 100 using torsion springs 206 that are coupled to the light engine (shown in FIGS. 23-28).

First Example Light Engine

A first example light engine 200 will be described in greater detail below in association with FIGS. 2-4. FIG. 2A illustrates a perspective view of a portion of a light engine of the edgelit recessed luminaire with a heat sink end cap, in accordance with example embodiments of the present disclosure; FIG. 2B illustrates another perspective view of a portion of another example light engine of the edgelit recessed luminaire with a waveguide end cap, in accordance with example embodiments of the present disclosure; FIG. 3 illustrates a cross-section view of the light engine of FIG. 2A without the end cap on one lateral side of the light engine, in accordance with example embodiments of the present disclosure; and FIG. 4 illustrates an enlarged view of a portion of the light engine that shows an arrangement of a heat sink assembly with a waveguide of the light engine illustrated in FIG. 2A, in accordance with example embodiments of the present disclosure.

Referring to FIGS. 2A and 3-4, the light engine 200 may include a heat sink assembly 201 and a waveguide 212 that is disposed in a waveguide housing cavity 402 defined by the heat sink assembly 201. As illustrated in FIGS. 2A and 3-4, the heat sink assembly 201 may have two components, i.e., a heat sink base 304 and a heat sink clamp 306 that are configured to operate in concert to couple a waveguide 212 to the light engine 200. In particular, the heat sink base 304 and the heat sink clamp 306 may be arranged such that a threaded channel 307 of the heat sink clamp 306 is axially aligned with a through aperture 210 of the heat sink base 304. Once the heat sink base 304 and the heat sink clamp 306 are arranged as described above, a fastener 208 may be passed through the through aperture 210 of the heat sink base 304 and into the threaded channel 307 of the heat sink clamp 306 to couple the heat sink base 304 to the heat sink clamp 306.

It is noted that the threaded channel 307 of the heat sink clamp may be arranged at an angle, such that when the waveguide 212 is coupled to the light engine 200, the fastener 208 that couples the heat sink clamp 306 to the heat sink base 304 may rest at an acute angle with respect to the waveguide 212 and offset from a mid-portion of the heat sink assembly 201.

As illustrated in FIGS. 2-4, the heat sink assembly 201 defines an LED housing cavity 401 and a waveguide housing cavity 402 that extend substantially the length of the heat sink assembly 201 and approximately along a middle portion of the heat sink assembly 201. In certain exemplary embodiments, the LED housing cavity 401 has a greater width than the waveguide housing cavity 402. However, in other exemplary embodiments, the width of the LED housing cavity 401 is not greater than the width of the waveguide housing cavity 402. The LED housing cavity 401 is configured to receive an LED module, e.g., circuit board 308 comprising a plurality of LEDs 310, while the waveguide housing cavity 402 is configured to receive a portion of the waveguide 212. Once a portion of the waveguide 212 is positioned within the waveguide housing cavity 402, the fastener 208 may be tightened into the threaded channel 307 of the heat sink clamp 306 to pull the heat sink clamp 306 against the heat sink base 304 and exert a horizontal clamping force (due to the acute angle arrangement) onto the waveguide 212.

Even though the present disclosure describes the heat sink assembly 201 as being a two component structure, one of ordinary skill in the art can understand and appreciate that in other exemplary embodiments, the heat sink assembly may be constructed using fewer or greater components.

The waveguide 212 is substantially rectangular shaped and includes a first surface 224, a second surface 228 facing a direction opposite the first surface 224, a first longitudinal edge 222, a second longitudinal edge 220 positioned opposite the first longitudinal edge 222, a first latitudinal edge 226 disposed between the first surface 224 and the second surface 228 and between the first longitudinal edge 222 and the second longitudinal edge 220, and a second latitudinal edge positioned opposite the first latitudinal edge 226 and disposed between the first surface 224 and the second surface 228 and between the first longitudinal edge 222 and the second longitudinal edge 220. The waveguide 212 is fabricated from an acrylic material and is substantially translucent. Alternatively, the waveguide 212 is formed using other suitable materials, such as glass, and can be, or made to be, opaque, if desired. At least one of the first surface 224 and the second surface 228 can include features, such as etchings, dimples, etc., that are formed into the surfaces 224, 228 to facilitate in bringing the light present within the waveguide 212 outside of the waveguide 212.

In certain example embodiments, the LED module is disposed in the LED housing cavity 401 of the heat sink assembly 201 and coupled to the heat sink base 304 in such a way that the LEDs 310 of the LED module are directed towards an edge (e.g., first longitudinal edge 222) of the waveguide 212 retained in the waveguide housing cavity 402. During operation, the light emitted from the LEDs 310 of the LED module enters the waveguide 212 through the first longitudinal edge 222 and is directed towards the second longitudinal edge 220 that faces the area to be illuminated. However, the features, as mentioned above, facilitate removal of the light from within the waveguide 212 through first and/or second surfaces (224, 228) of the waveguide 212. Alternatively, in some example embodiments, light may also be emitted through the second longitudinal edge 220 that faces the area to be illuminated.

In certain example embodiments, the light engine 200 may include a waveguide cap 216 that covers the lateral ends/latitudinal edges (226) of the waveguide 212 as illustrated in FIG. 2B. Further, the light engine 200 may include a heat sink cap 214 to cover the lateral edges of the heat sink assembly 201 as illustrated in FIG. 2A. In other example embodiments, the light engine 200 may have a single light engine end cap that covers the lateral ends of both the heat sink assembly 201 and the waveguide 212. Even though the present disclosure describes that the lateral ends of the light engine 200 may be covered using heat sink end caps 214 and/or waveguide caps 216, in some example embodiments, such as when the luminaire is row mounted (end to end) one of ordinary skill in the art can understand and appreciate that the heat sink end caps 214 and/or waveguide caps 216 of the light engine 200 may be removed.

Furthermore, as illustrated in FIGS. 2-4, the heat sink base 304 may include a pair of mounting flanges 202 that are configured to couple one or more torsion spring brackets 204 to the light engine 200. The torsion spring brackets 204 are in turn configured to receive and support torsion springs 206 that are used to removably couple the light engine 200 to the housing 100 as illustrated in FIGS. 5-6.

Second Example Light Engine

Figure 19:
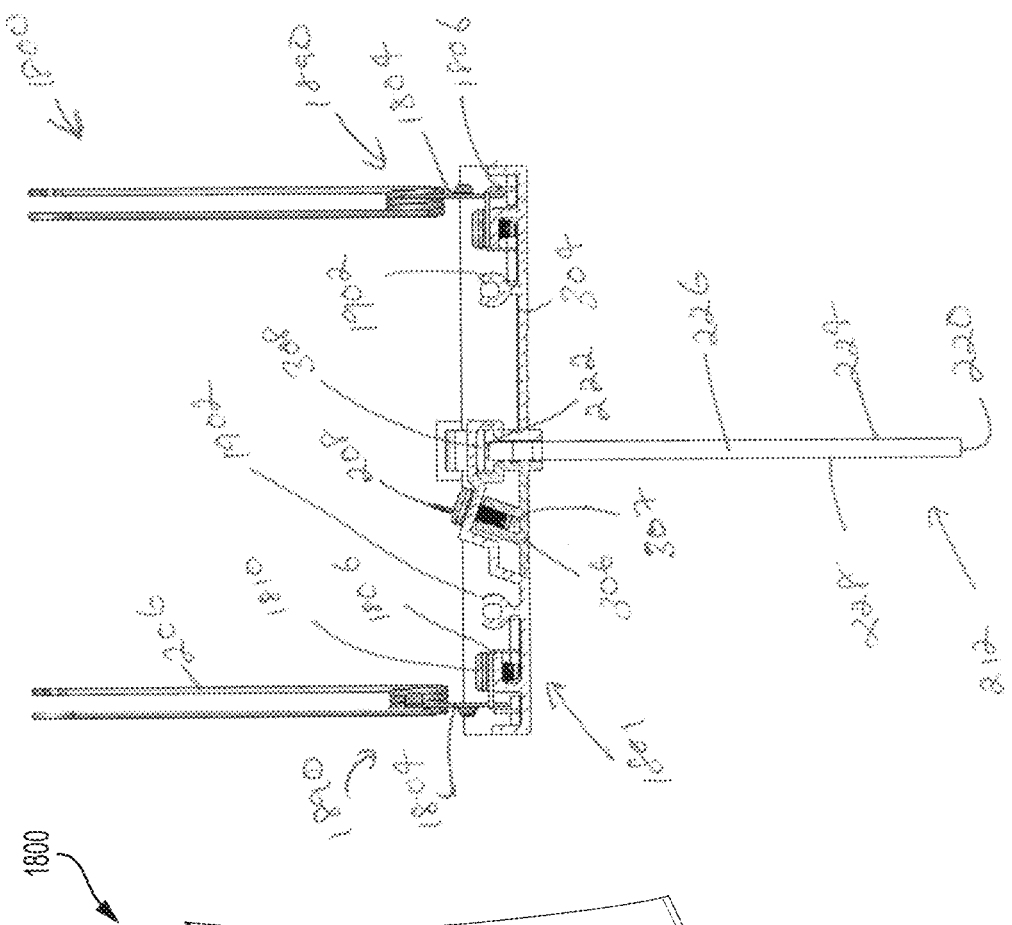
FIG. 19 illustrates a cross-section view of the light engine of FIG. 18 without the end cap on one lateral side of the light engine, in accordance with example embodiments of the present disclosure.
Figure 18:
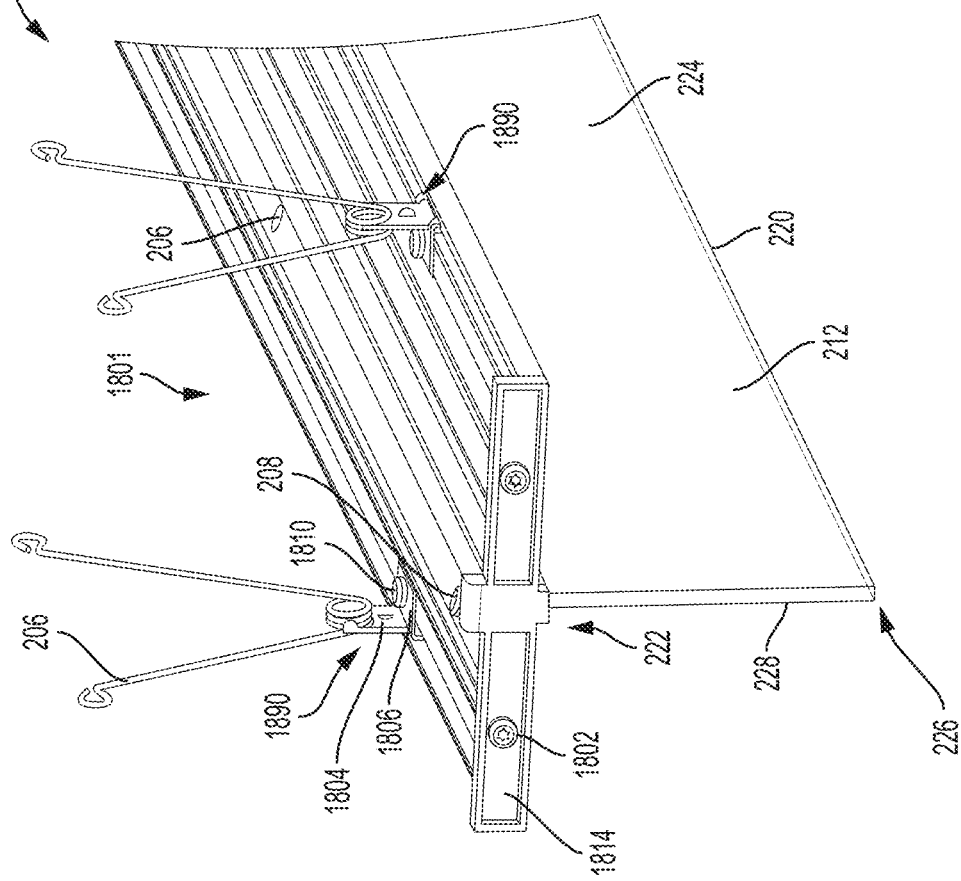
FIG. 18 illustrates a perspective view of a portion of yet another example light engine of the edgelit recessed luminaire with a heat sink end cap, in accordance with example embodiments of the present disclosure.

A second example light engine 1800 will be described in greater detail below in association with FIGS. 18 and 19. The second example light engine 1800 may be substantially similar to the first example light engine 200, except that the second example light engine 1800 may include two additional C-shaped channels 1902 that are formed in the heat sink base 304 as illustrated in FIG. 19. The C-shaped channels 1902 may be configured to receive fasteners 1802 therethrough to couple a heat sink waveguide 1814 to the lateral edges of the heat sink assembly 1801 such that the heat sink waveguide 1814 covers the lateral edges of the heat sink assembly 1801.

Figure 22:
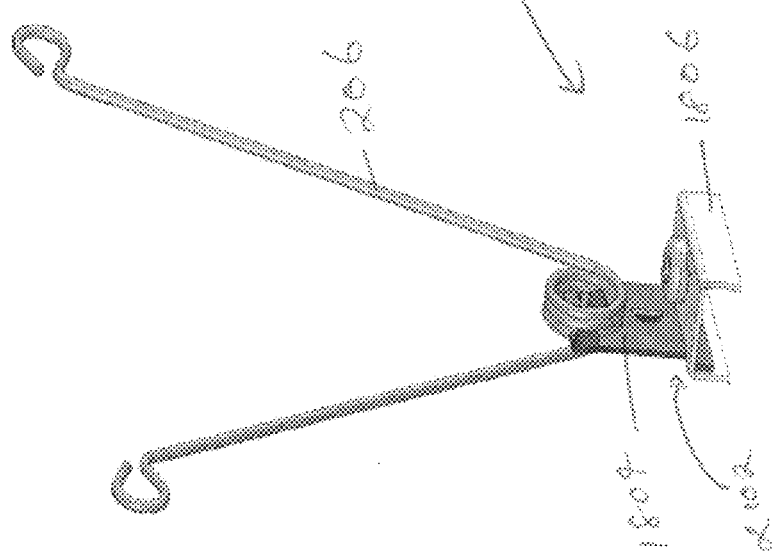
FIGS. 20-22 illustrate an example two-part swivel spring mount and each component of the example two-part swivel spring mount, in accordance with example embodiments of the present disclosure.
Figure 20:
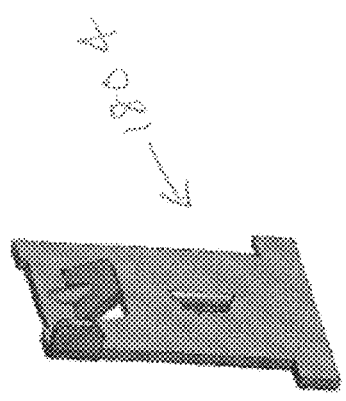
Figure 21:
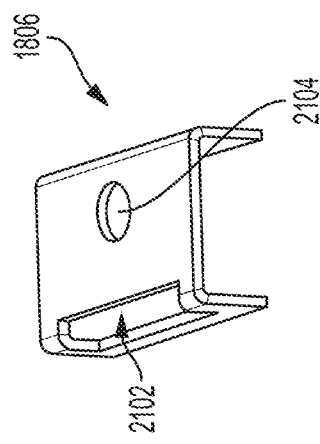
Figure 24:
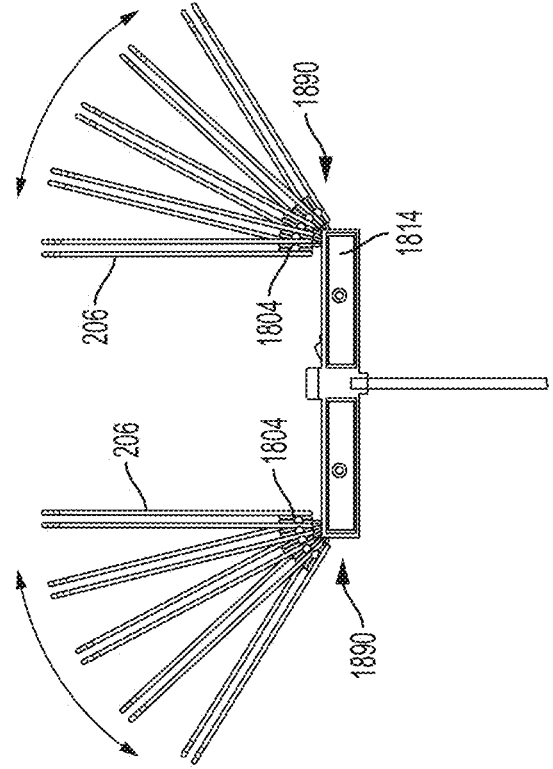
FIG. 24 illustrates how the example two-part swivel spring mount swivels with respect to the light engine of FIG. 18, in accordance with example embodiments of the present disclosure.

Further, the torsion spring mounting bracket 1890 coupled to the second example light engine 1800 may be different from that of the first example light engine 200 in that the torsion spring mounting bracket 1890 coupled to the second example light engine 1800 may be a two-part mounting bracket that is configured to swivel about the second example light engine 1800 to which it is coupled as illustrated in FIG. 24. In particular, the torsion spring mounting bracket 1890 may include a substantially U-shaped heat sink coupling part 1806 (shown in FIG. 21) that includes: (a) a heat sink coupling aperture 2104 that may be configured to receive a fastener 1810 therethough to fixedly couple the heat sink coupling part 1806 to the heat sink base 304 as illustrated in FIGS. 18 and 19, and (b) a slot 2102. Further, the torsion spring mounting bracket may include a torsion spring coupling part 1804 that is a substantially inverted T-shaped member as illustrated in FIG. 20. The torsion spring coupling part 1804 may be rotatably coupled to the heat sink coupling part 1806 via the slot 2102 of the heat sink coupling part 1806 as illustrated in FIG. 22. As illustrated in FIG. 24, the torsion spring coupling part 1804 and the torsion spring 206 coupled thereto may be configured to rotate from a first position that is substantially perpendicular to the heat sink assembly 1801 to a second position that is substantially at 45 degree angle with respect to the heat sink assembly 1801. However, in other example embodiments, the torsion spring coupling part 1804 and the torsion spring 206 may be configured to rotate more than a 45 degrees angle without departing from a broader scope of the present disclosure.

Quick Connect and Disconnect Coupling Feature

Turning to FIGS. 5 and 6, FIG. 5 illustrates a cross-section view of the edgelit recessed luminaire with the torsion springs in an open position supporting the light engine in the housing, in accordance with example embodiments of the present disclosure; and FIGS. 6A and 6B illustrate how the light engine is coupled to the housing using a quick connect and disconnect method, in accordance with example embodiments of the present disclosure.

Referring to FIGS. 5-6, to couple the light engine 200 to a housing 100 that is already installed in a ceiling (T-grid ceiling, existing drywall ceiling, or new construction drywall ceiling), the arms of torsion springs 206 that are attached to the light engine 200 may be pinched together and inserted into torsion spring receivers 120. During installation of the housing 100, the torsion spring receivers 120 that are stamped into the side panels 110 of the housing 100 may be pushed and bent inwards towards the inner cavity 140 such that the torsion spring receivers 120a are substantially perpendicular to the side panels 110. Once the torsion springs 206 of the light engine 200 are inserted into and engage the corresponding torsion spring receivers 120a, the light engine 200 may be suspended from the housing via the torsion springs 206 as illustrated in FIG. 5, thereby freeing the hands of the user to make other adjustments or to access electronic devices and/or wiring disposed in the inner cavity 140 of the housing 100.

Then, the user may push the light engine 200 in the direction of the top surface 102 of the housing 100, which in turn causes the arms of the torsion springs 206 to retract back to their default extended state. As the torsion springs 206 retract back to their default extended state, they pull they light engine 200 up towards the top surface 102 of the housing 100 till: (a) the flange 292 of the heat sink end cap 214 engages the ceiling 602 or the flange 112 of the housing 100, and (b) the heat sink assembly 201 of the light engine 200 covers the inner cavity 140 (open side) of the housing 100.

The above described torsion spring coupling mechanism allows quick connect and disconnect of the light engine 200 to the housing 100. Further, said torsion spring coupling mechanism provides a user easy access to the electronic devices and/or wiring disposed in the inner cavity 140 of the housing 100. For example, when a user wants to access the inner cavity 140 of the housing 100, the user can pull the light engine 200 downwards (opposite direction of top surface 102) till the light engine 200 is suspended from the housing 100 via the torsion springs 206 as illustrated in FIG. 5 and the inner cavity 140 is open to access by the user. After the user has finished and no longer needs access to the inner cavity 140, the user can push the light engine 200 back towards the housing 100 to close the inner cavity 140 as described above.

Even though FIGS. 5-6 illustrate coupling the torsion springs 206 of the light engine 200 to the torsion spring receivers 120 of the housing 100, one of ordinary skill in the art can understand and appreciate that in other example embodiments, the torsion springs of the light engine may be configured to couple to any other appropriate and functionally equivalent receivers in the housing without departing from a broader scope of the present disclosure. For example, as illustrated in FIGS. 23 and 25-28, the torsion springs 206 attached to the light engine 1800 may be coupled to the HD spring receivers 124 without compromising the quick connect and disconnect ability. The angled edges of the HD spring receivers 124 may guide the hook ends of the torsion springs 206 to the opening on top of the HD spring receivers 124 where the torsion springs 206 can expand and engage the top edge of the HD spring receivers 124 as illustrated in FIGS. 26 and 27. Once the torsion springs 206 engage the top edge of the HD spring receivers 124, the light engine 1800 may be suspended from the housing as described above in association with FIGS. 5-6. When the light engine 1800 is suspended from the housing 100, an installer may have access to the cavity 140 formed by the housing and the electrical components and/or wiring disposed in the housing as described above in association with FIGS. 5-6. Depending on the type of torsion spring mounting bracket that is used to couple the torsion springs 206 to the light engine 1800 (or 200), the light engine 1800 (or 200) may swivel when it is suspended from the housing to provide better access to the cavity 140 formed by the housing and the electrical components and/or wiring disposed in the housing. For example, the light engine 1800 that is coupled to the torsion springs 206 using the two-part swivel torsion spring bracket 1890 may swivel by approximately 45 degrees (or more or less in other examples) when the torsion springs 206 along one long edge of the light engine 1800 are coupled to torsion spring receivers 120 (or HD receivers 124) on the corresponding side panel 110 of the housing, thereby providing better access to the cavity 140 formed by the housing without any interference of the torsion springs 206 coupled to the opposite long edge of the light engine 1800.

Once the installer has made the electrical connections, the installer may push the light engine 1800 up towards the housing to close the access to the cavity 140. The bottom edges of the HD spring receiver 124 may prevent an over insertion of the light engine 1800 into the housing when the top surface of the light engine's heat sink assembly engages the bottom edges of the HD spring receivers 124.

Mounting of Edgelit Recessed Luminaire in T-Grid Ceiling

Turning now to FIGS. 8-10, FIGS. 8A and 8B illustrate a top and bottom perspective view of the edgelit recessed luminaire installed in a T-grid ceiling, in accordance with example embodiments of the present disclosure; FIG. 9 illustrates how the housing of the edgelit recessed luminaire is locked to the T-grid frame in the T-grid ceiling using a locking tab of the housing, in accordance with example embodiments of the present disclosure; and FIG. 10 illustrates an alternative method of locking another example housing of the edgelit recessed luminaire to the T-grid frame in the T-grid ceiling using a locking tab of the other example housing, in accordance with example embodiments of the present disclosure.

Figure 8A:
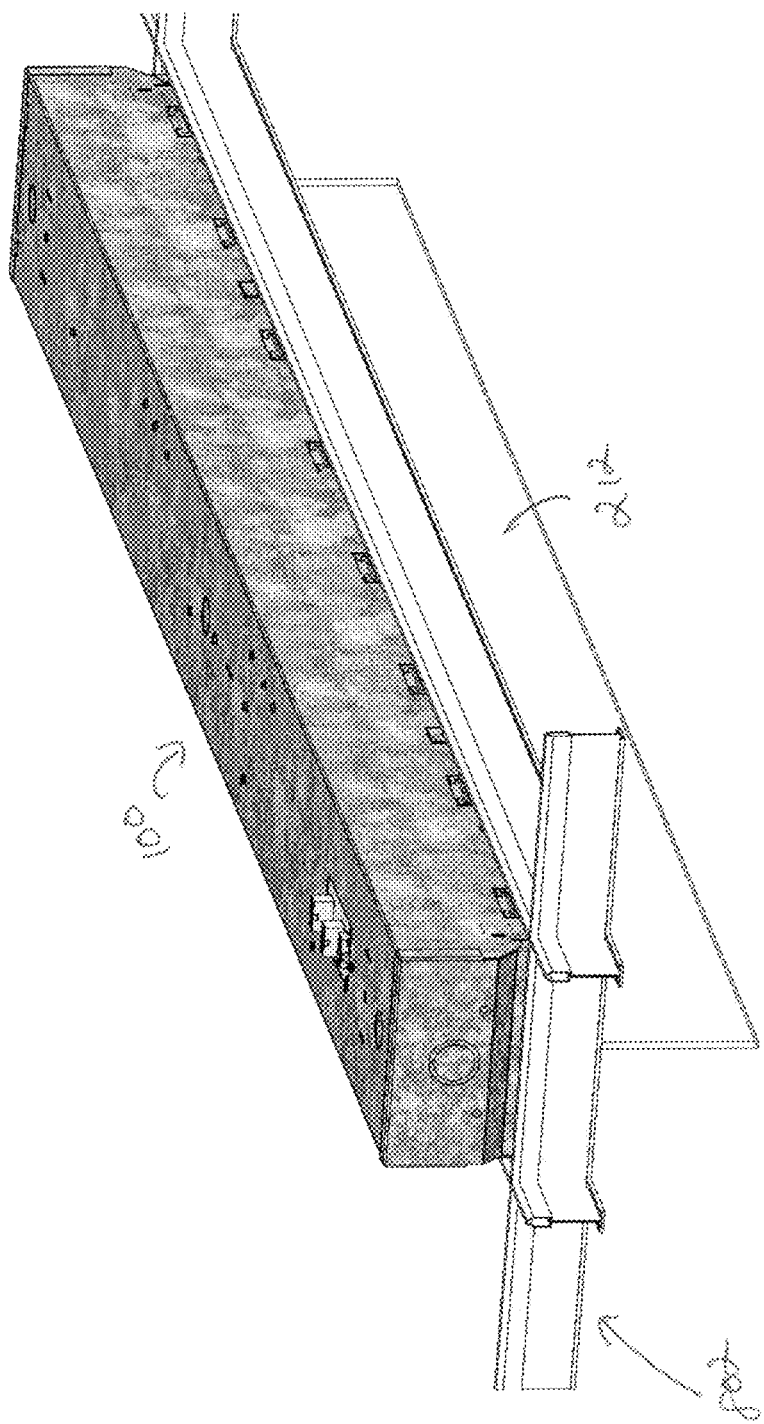

Referring to FIGS. 8-10, the edgelit recessed luminaire may be installed in the T-grid ceiling by mounting the housing 100 in the T-grid frame 802 and then coupling the light engine 200 to the housing 100 as described above in association with FIGS. 5-6 such that the waveguide 212 of the light engine 200 extends substantially vertically downwards as illustrated in FIGS. 8A and 8B. In particular, as illustrated in FIG. 10, the housing 100 may be mounted in the T-grid frame 802 by resting the flange 112 of the housing 100 on the bottom ledge 806 of the T-grid frame 802 such that the T-grid frame 802 supports the housing 100. Further, the locking tabs 116 of the housing 100 may be pushed and bent out to a position 116a as illustrated in FIG. 9 to engage the top portion 804 of the T-grid frame 802 and lock the housing 100 in place. In addition to or in place of the locking tab 116, the locking tab 118 may be used as illustrated in FIG. 10. It is noted that FIG. 10 is another example embodiment of the housing 1000 than that shown in FIGS. 1, 8, 9, and 11 because the locking tabs 118 in the housing 1000 are located on the end panels 108 rather than on the side panels 110. Irrespective of where the locking tabs 118 are positioned, the function and operation of the locking tabs 118 may remain the same in the housing 100 of FIGS. 1, 8, 9, and 11 and the housing 1000 of FIG. 10.

Even though FIGS. 8-10 illustrate locking the edgelit recessed luminaire in the T-grid frame 802 using locking tabs 116 in the housing 100, one of ordinary skill in the art can understand and appreciate that in other example embodiments, the edgelit recessed luminaire may be securely locked and coupled to T-grid frame 802 using other coupling mechanisms without departing from a broader scope of the present disclosure. For example, as illustrated in FIGS. 29-30, the housing 1200 of the edgelit recessed luminaire may not include locking tabs 116. In such example embodiments, the edgelit recessed luminaire may be coupled to the T-grid frame 802 using earthquake clips 1215 that are fastened to the housing 1200 of the edgelit recessed luminaire. In particular, to securely lock the edgelit recessed luminaire to the T-grid frame 802 in the ceiling, the hooked bottom edge of the earthquake clips 1215 may engage the top portion 804 of the T-grid frame's main member 801 as illustrated in FIG. 30.

Row Mount of Edgelit Recessed Luminaires

Even though FIGS. 8 and 29 illustrate one edgelit recessed luminaire being installed in the T-grid ceiling, one of ordinary skill in the art can understand that the edgelit recessed luminaires described herein are configured for continuous row mounting, if desired. For example, more than one edgelit recessed luminaire (100a, 100b) may be aligned or coupled end to end as illustrated in FIG. 11 and FIGS. 31-33. In one example embodiment, two edgelit recessed luminaires (100a, 100b) shown in the example embodiment of FIG. 11A, may be row mounted such that the end panel 108 of one edgelit recessed luminaire 100a may be aligned with the end panel 108 of the other edgelit recessed luminaire 100b. Each end panel 108 has knockouts 119 for routing wires between the row mounted edgelit recessed luminaires. Further, as illustrated in FIG. 11B, the gap between the waveguides 212 of the two edgelit recessed luminaire (100a, 100b) that are row mounted may be covered using waveguide spacers 1100. The waveguide spacers 1100 may include a bridge that has a top portion 1101 and a bottom portion 1102. The top portion 1101 of the bridge covers the lateral edges of the respective light engine's heat sink assembly 201. Further, the bottom portion 1102 of the bridge may be configured to receive the lateral edge of a first waveguide 212a of one edgelit recessed luminaire 100a on one side of the bridge and the lateral edge of a second waveguide 1103 that is used to cover the gap between the two waveguides (212a, 212b) of the two row mounted edgelit recessed luminaires (100a, 100b).

Figures 31, 32:
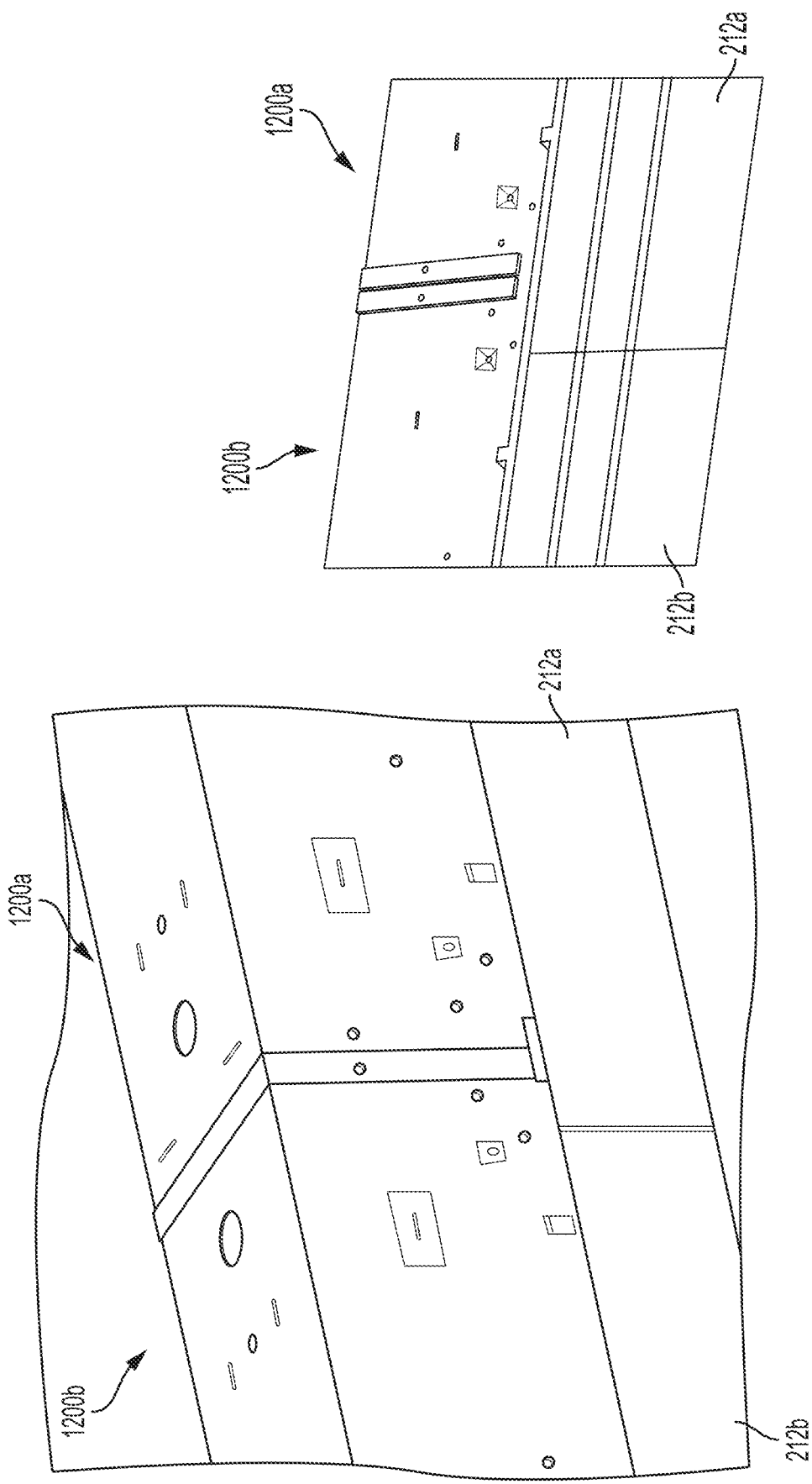
FIGS. 31-33 illustrate top, side, and bottom perspective views, respectively, of a portion of two edgelit recessed luminaires that are row mounted in the T-grid ceiling, in accordance with example embodiments of the present disclosure.
Figure 33:
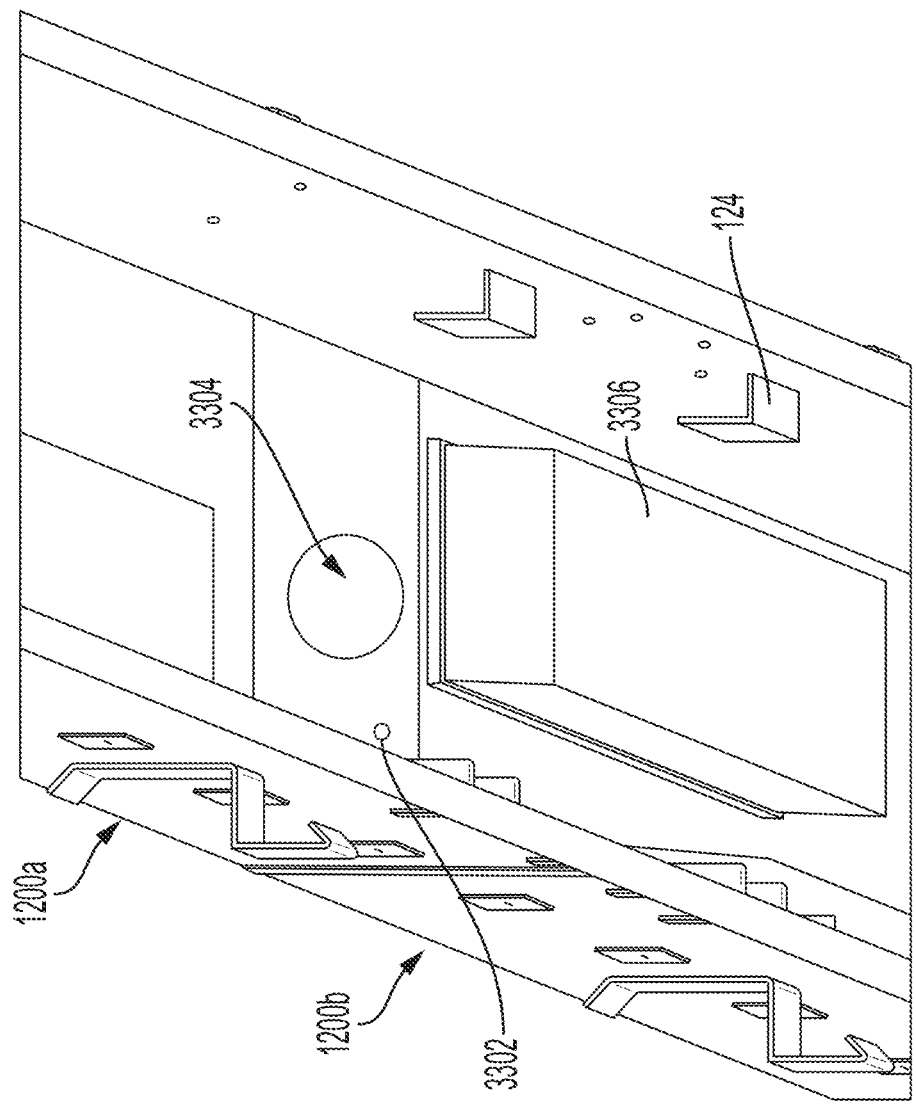

Even though FIG. 11 illustrates the end panels 108 of the housings (100a, 100b) of the row mounted edgelit recessed luminaires as having notched portions 108b (shown in FIG. 1) that extend away from each other when row mounted, in other example embodiments, one or both the end panels of the housings may be flat as illustrated in FIGS. 31-33. In said example embodiment, the end panels of the housings (1200a, 1200b) of the row-mounted edgelit recessed luminaires may have coupling apertures 3302 that may be axially aligned with each other to receive fasteners therethough for coupling the housing 1200a of one edgelit recessed luminaire to the housing 1200b of the other edgelit recessed luminaire. Further, the end panels of the housings (1200a, 1200b) may have wire openings 3304 that are axially aligned with each other when the housings (1200a, 1200b) are row mounted for routing wires from one housing to another. Furthermore, unlike FIG. 11, the waveguides (212a, 212b) of the row-mounted edgelit recessed luminaires in FIGS. 31-33 may not have a gap (or very minimal gap) in between them, thereby not requiring waveguide spacers. Depending on where the housing 1200 is placed in the row mount configuration, one or both of the end panels 108 of the housing 1200 may be flat. For example, a housing 1200 that is positioned in between two other housings 1200 in a row mount configuration (e.g., middle housing) may have both the end panels 108 flat. In said example, the housings positioned on either ends of said row mount configuration may have only one flat end panel while the other end panel 108 may have the notched portion 108b.

Figure 12:
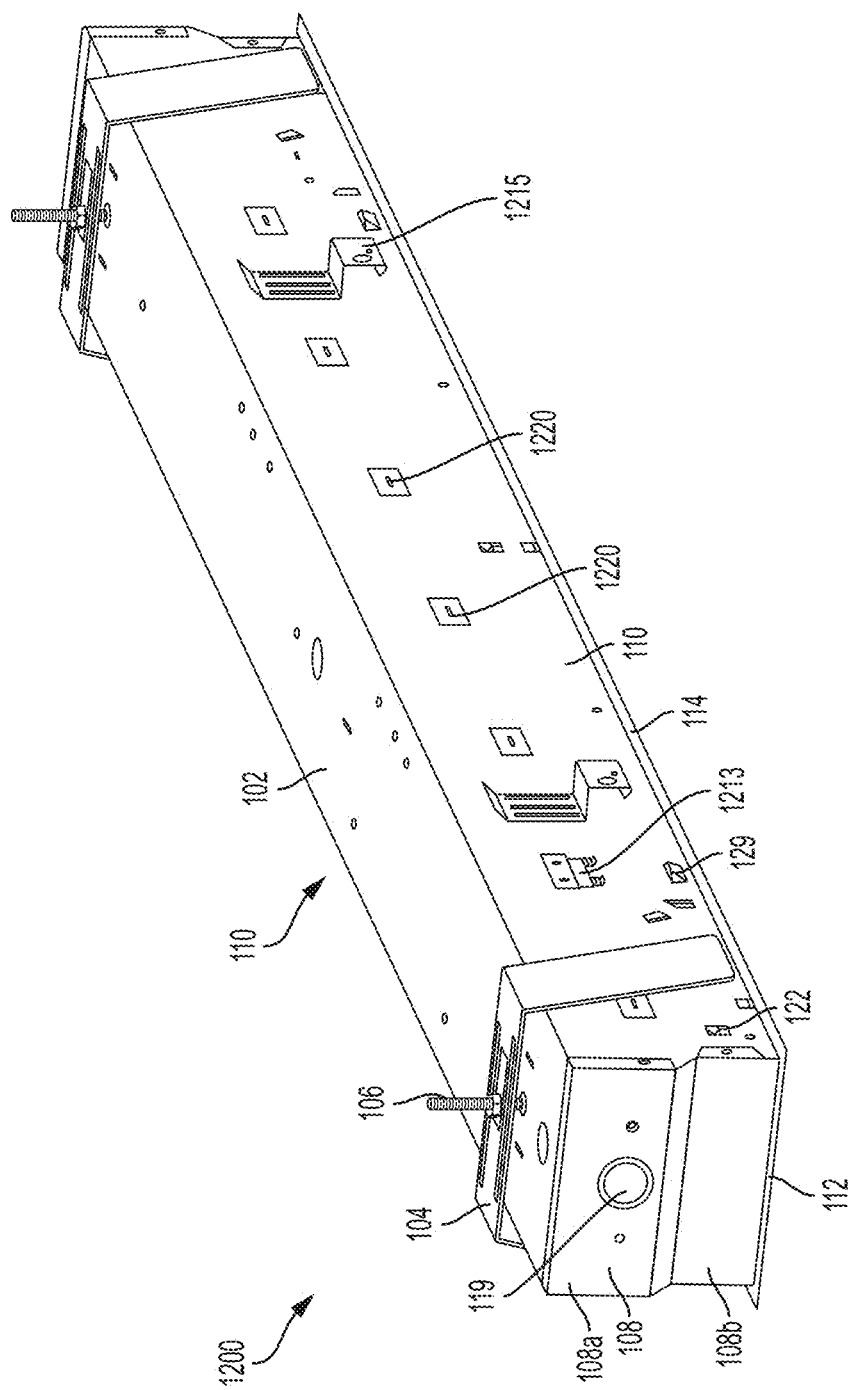
FIGS. 12 and 13 illustrate top and bottom perspective views, respectively, of another example housing of an edgelit recessed luminaire configured to house a modular spring receiver, in accordance with example embodiments of the present disclosure.
Figure 14:
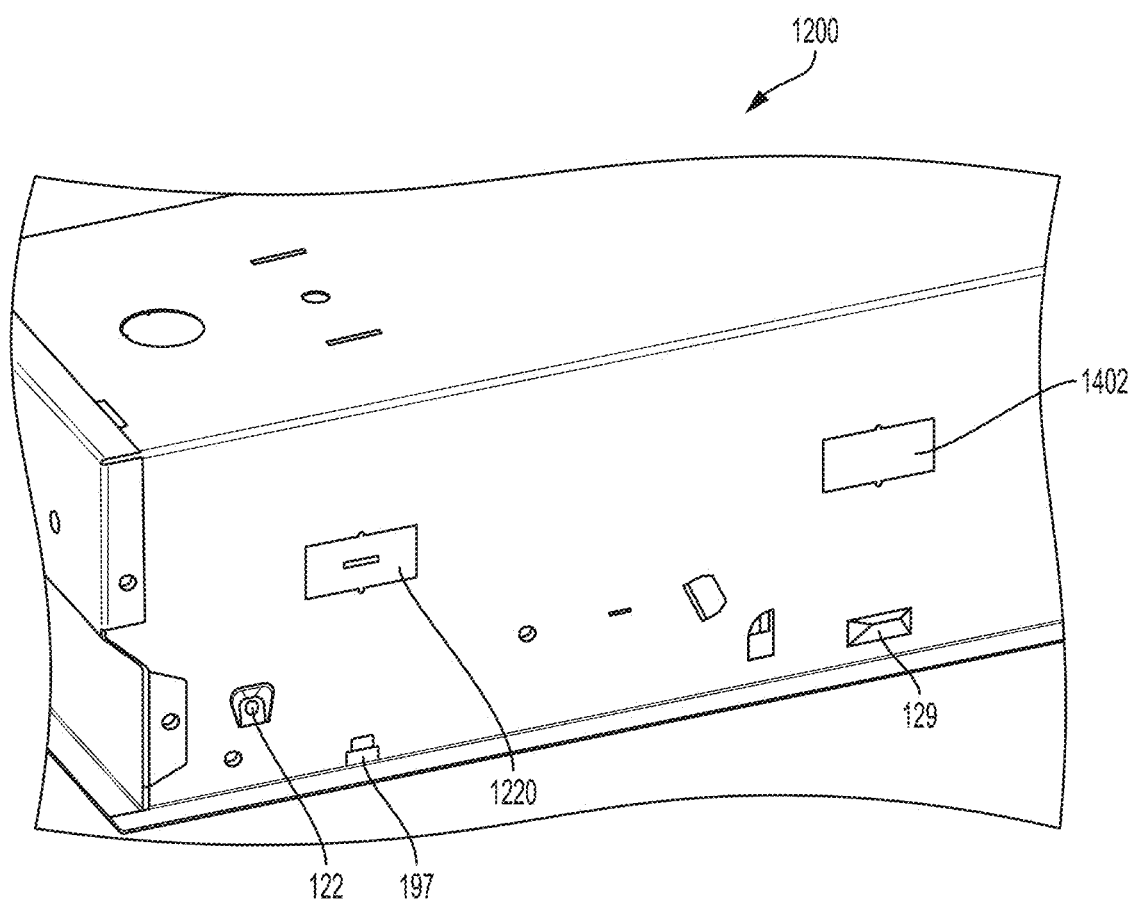
FIG. 14 illustrates an enlarged view of a portion of the example housing of FIGS. 12 and 13 with an opening formed by removing a knockout to accommodate a modular spring receiver, in accordance with example embodiments of the present disclosure.
Figure 16:
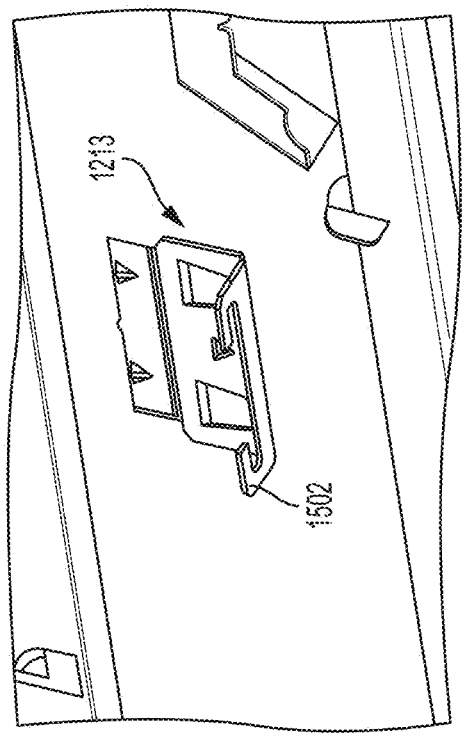
FIGS. 16 and 17 illustrate inside and outside views of the portion of the example housing of FIGS. 12 and 13 with the modular spring receiver of FIG. 15 installed in the opening formed by removing the knockout, in accordance with example embodiments of the present disclosure.
Figure 17:
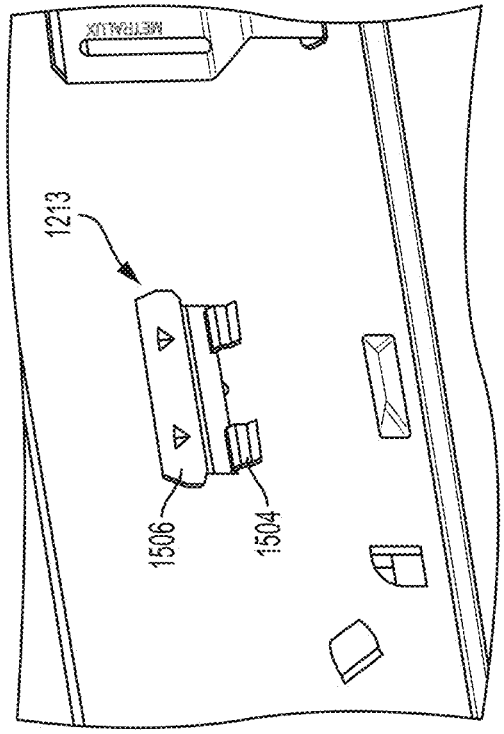
Figure 15:
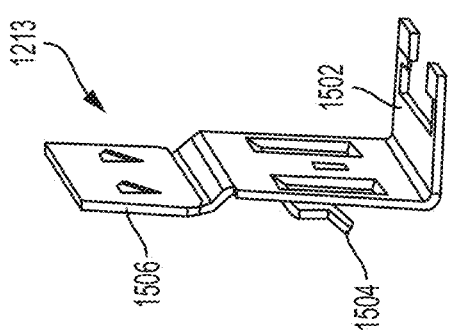
FIG. 15 illustrates a perspective view of an example modular spring receiver, in accordance with example embodiments of the present disclosure.

Edgelit Recessed Luminaires with Housing Having Modular Torsion Spring Receivers Even though FIGS. 1-10 illustrate a housing 100 having locking tabs 116 and torsion spring receivers 120 that are stamped into the side panel 110 of the housing 100, one of ordinary skill in the art can understand and appreciate that in other example embodiments, the edgelit recessed luminaire may include any other appropriate housing that does not have the stamped in torsion spring receivers and/or locking tabs without departing from a broader scope of the present disclosure. For example, as illustrated in FIG. 12, instead of the stamped in torsion spring receivers 120, the housing 1200 of the edgelit recessed luminaire may include a plurality of knockouts 1220 that may be detached from the housing 1200 to receive a modular torsion spring receiver 1213. The modular torsion spring receiver 1213 may include an upper flange 1506, receiver hooks 1502, and feet 1504 as illustrated in FIG. 15. In one example, a knockout 1220 may be detached from the housing 1200 to form an opening 1402 as illustrated in FIG. 14. Further, as illustrated in FIGS. 16-17, the modular torsion spring receiver 1213 may be securely coupled to the housing 1200 through the opening 1402 using the upper flange 1506 and the feet 1504 of the modular torsion spring receiver 1213. In particular, the modular torsion spring receiver 1213 may be coupled to the housing 1200 such that the feet 1504 of the modular torsion spring receiver 1213 rest on an edge of the opening 1402 and the flange 1506 engages an outer surface 110a of the side panel 110 while the receiver hooks 1502 are disposed inside the cavity 140 formed by the housing 1200. Further, the housing 1200 of FIG. 12 may be different from the housing 100 of FIG. 1 in that the housing 1200 may not include the locking tabs 116 and/or 118. Instead, earthquake clips 1215 may be coupled to the housing 1200 of FIG. 12 to securely lock the housing 1200 to a T-grid frame 802 during T-grid mounting as described above in greater detail in association with FIGS. 29 and 30.

Even though FIGS. 1-33 illustrate a light engine 200 or 1800 with an edgelit waveguide being coupled to the housing, one of ordinary skill in the art can understand and appreciate that in other example embodiments, any other type of light modules may be coupled to the housing without departing from a broader scope of the present disclosure. For example, a linear light module may be coupled to the housing as illustrated in FIGS. 34-43 which will be described in greater detail below.

Linear Recessed Luminaires

Figure 13:
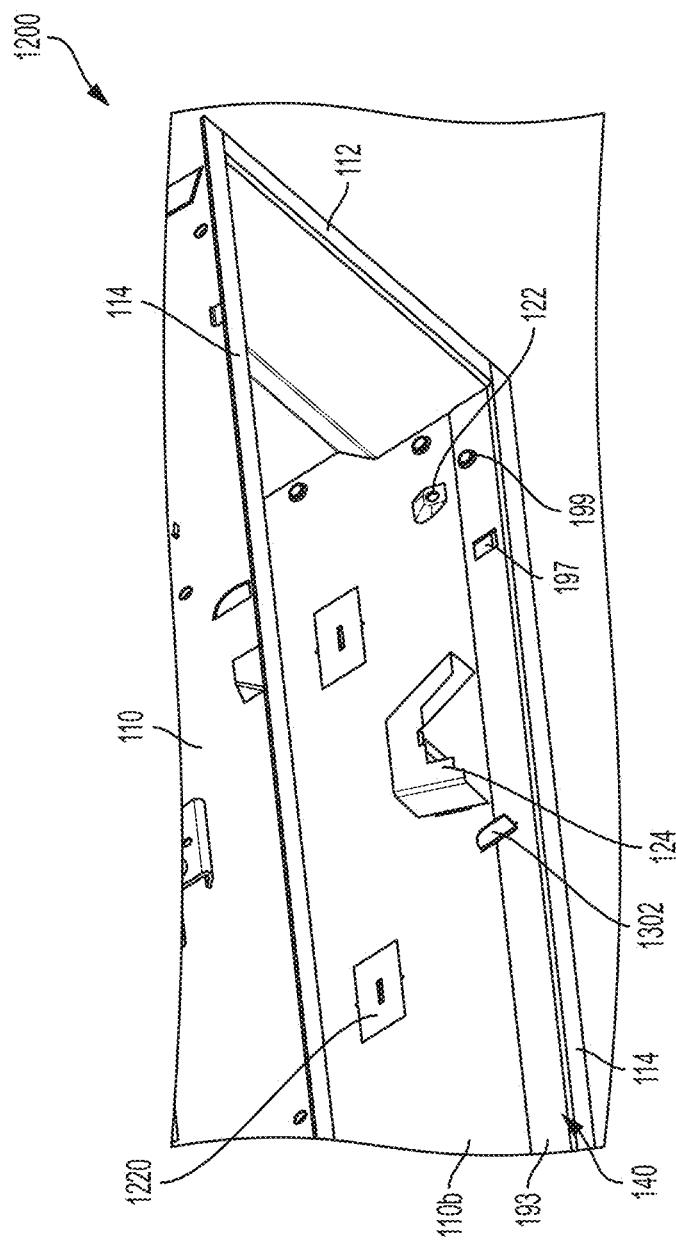
Figure 34:
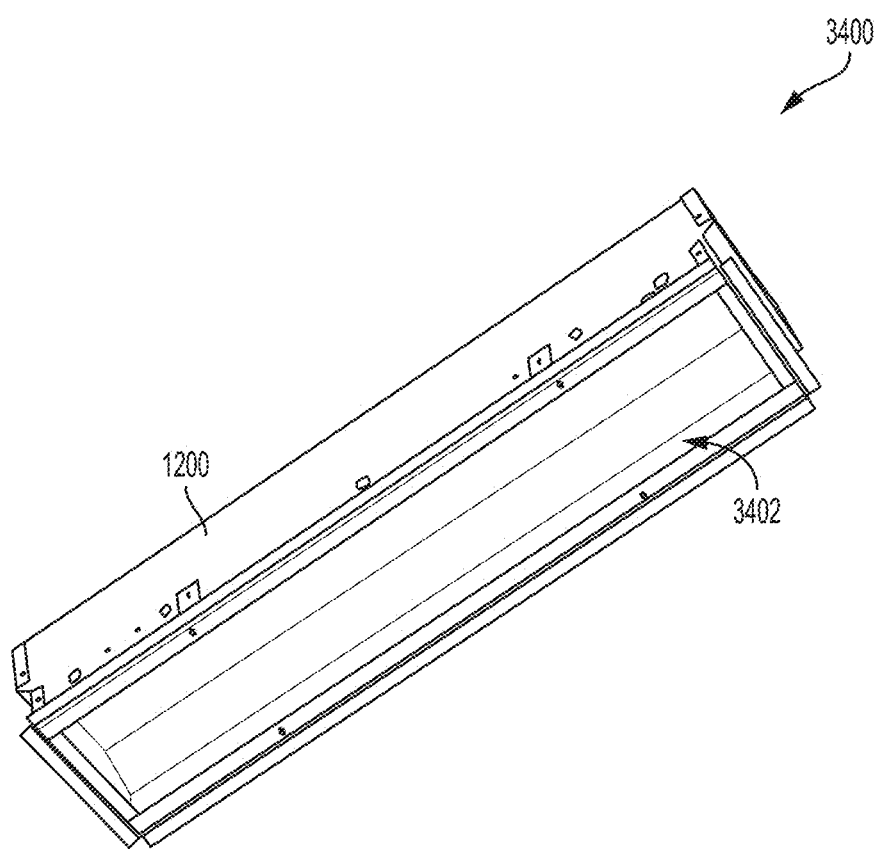
FIG. 34 illustrates another example recessed luminaire with a linear light module installed in the housing of FIGS. 12 and 13, in accordance with example embodiments of the present disclosure.
Figure 35:
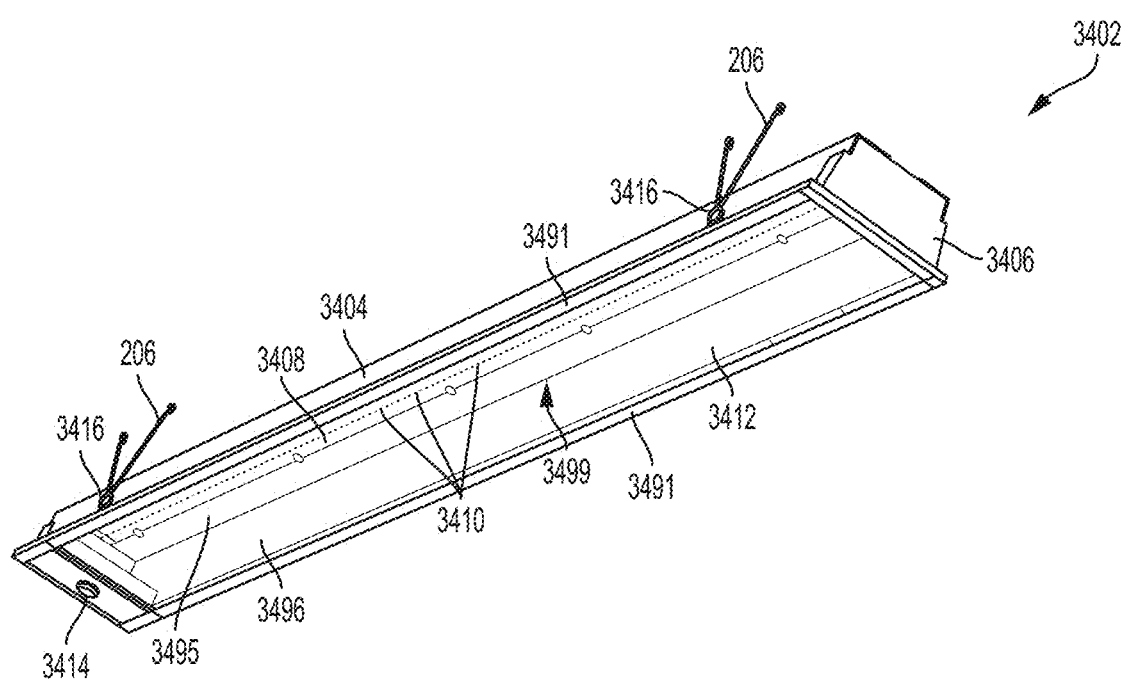
FIG. 35 illustrates a perspective view of the example linear light module, in accordance with example embodiments of the present disclosure.
Figure 42:
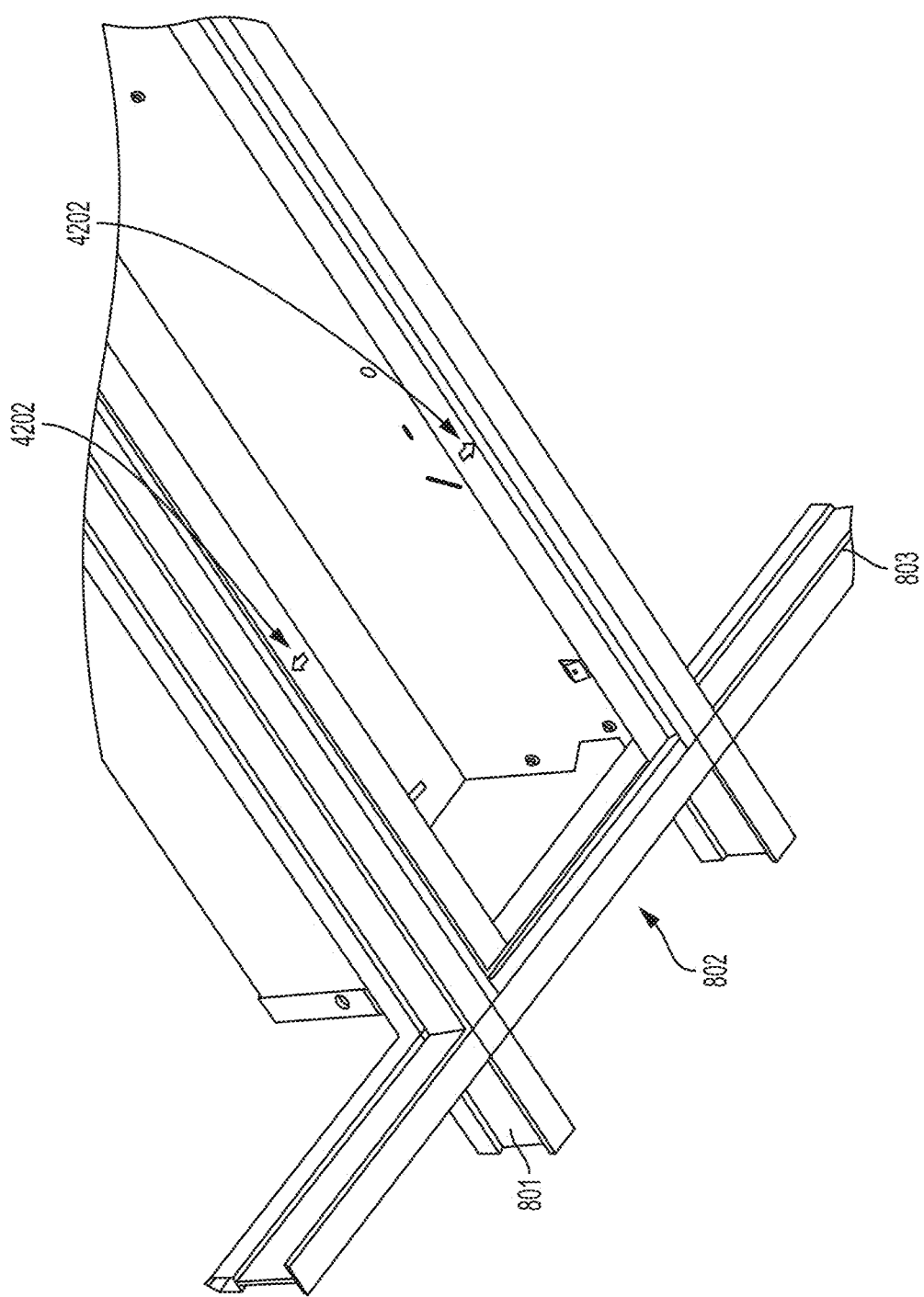
FIG. 42 is an enlarged view of a portion of the recessed luminaire of FIG. 34, in accordance with example embodiments of the present disclosure.
Figure 43:
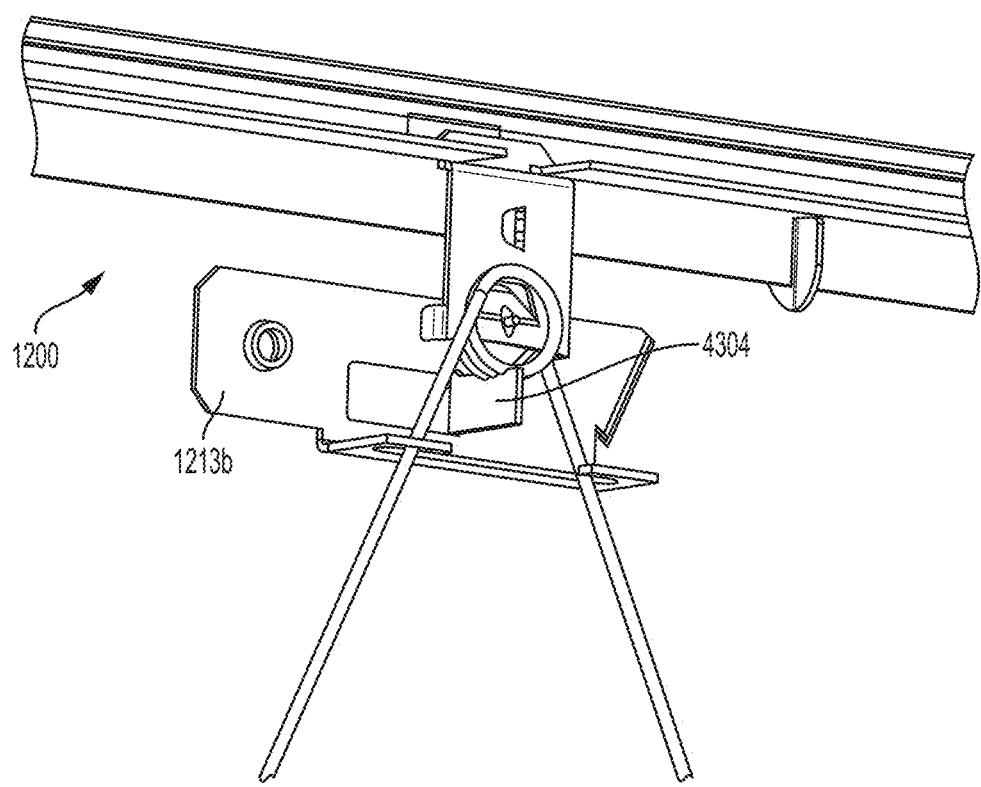
FIG. 43 illustrates another example torsion spring receiver with a stop mechanism to prevent an over insertion of a spring mount of the linear light module into the torsion spring receiver disposed in the housing of FIGS. 12 and 13, in accordance with example embodiments of the present disclosure.

FIG. 34 illustrates another example recessed luminaire with a linear light module installed in the housing of FIGS. 12 and 13, in accordance with example embodiments of the present disclosure; FIG. 35 illustrates a perspective view of the example linear light module, in accordance with example embodiments of the present disclosure; FIGS. 36-39 illustrates how the linear light module is coupled to the housing of FIGS. 12 and 13, in accordance with example embodiments of the present disclosure; FIGS. 40 and 41 illustrates how the torsion springs are rotatably coupled to the linear light module using swivel clips, in accordance with example embodiments of the present disclosure; FIG. 42 is an enlarged view of a portion of the recessed luminaire of FIG. 34, in accordance with example embodiments of the present disclosure; and FIG. 43 illustrates another example torsion spring receiver with a stop mechanism to prevent an over insertion of a spring mount of the linear light module into the torsion spring receiver disposed in the housing of FIGS. 12 and 13, in accordance with example embodiments of the present disclosure.

Figure 37:
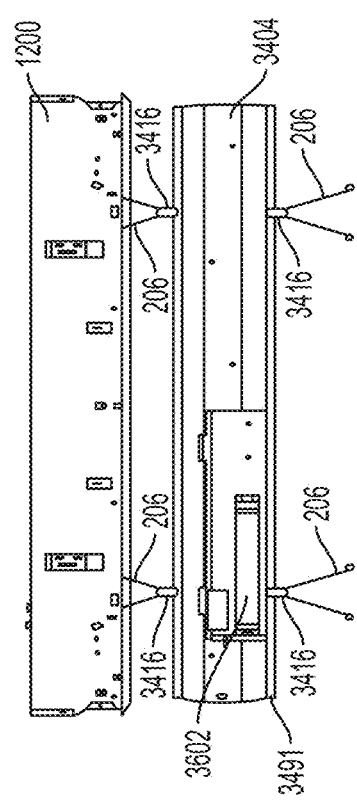
FIGS. 36-39 illustrate how the linear light module is coupled to the housing of FIGS. 12 and 13, in accordance with example embodiments of the present disclosure.
Figure 36:
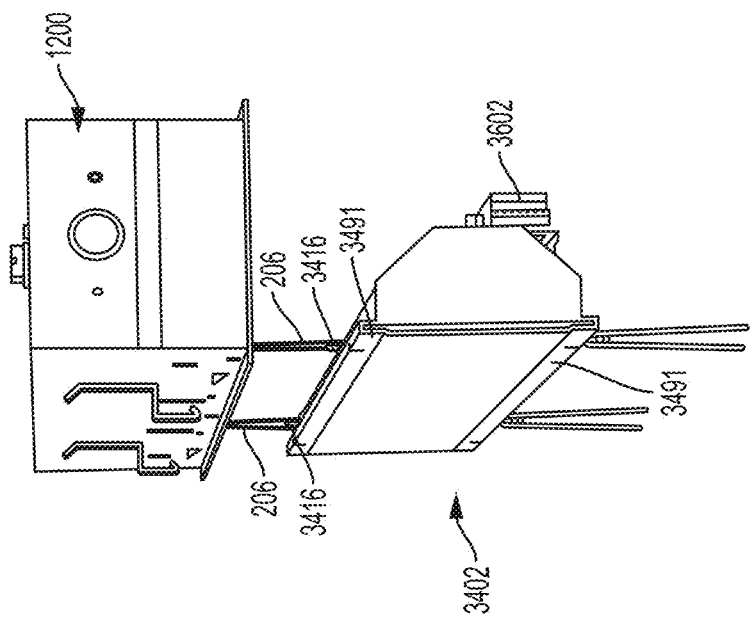
Figure 38:
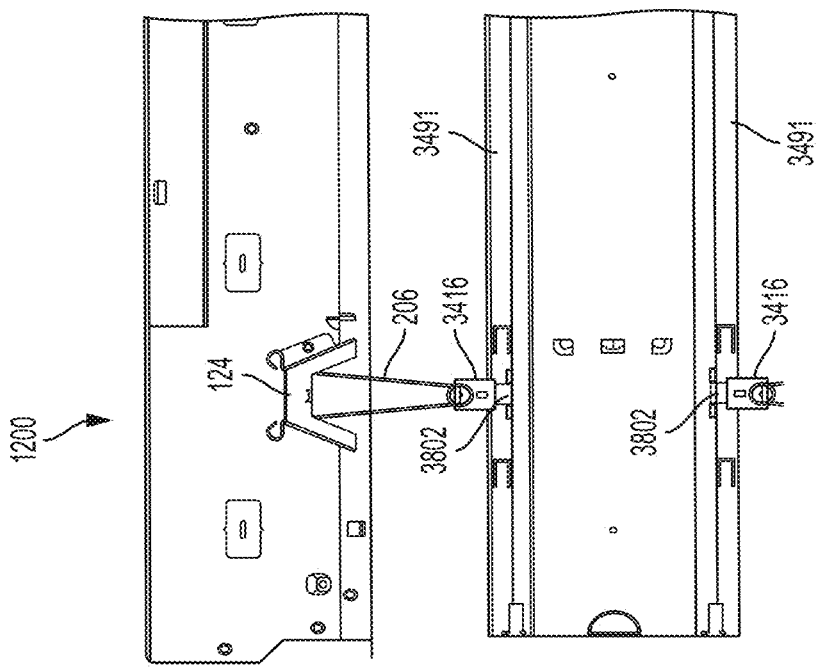

Referring to FIGS. 34-43, the recessed luminaire 3400 may include a housing 1200 and a linear light module 3402 that is coupled to the housing 3402. The linear light module 3402 may include a secondary linear light module housing 3404 (herein 'secondary housing 3404') that has a substantially rectangular shaped top panel 3495 and two angled side panels 3496 that extend from opposite long edges of the top panel 3495. Further, the secondary housing 3404 may include side flanges 3491 that extend out from the bottom edges of the side panels 3496. The secondary housing 3404 may also include end caps 3406 disposed at opposite lateral end of the secondary housing 3404. The top panel 3495, the side panels 3496, and the end caps 3406 may be configured to form a cavity 3499 that is open on one side, i.e., opposite to top panel 3495. An optic, such as a diffuser or lens 3412 may be disposed at the open side of the cavity 3499 and coupled to the bottom edges of the side panels 3496 and the end caps 3406. Further, the linear light module 3402 may also include a plurality of LEDs 3410 that are disposed on a circuit board 3408 that is fastened to the top surface 3495 of the secondary housing 3404. In particular, the plurality of LEDs 3410 may be disposed such that they emit light in the direction of the lens 3412 to an illumination area, such as a room. Furthermore, the linear light module 3402 may include a motion sensor 3414 that is configured to control an operation of the linear light module 3402 based on detecting motion in the illumination area. Electronic components 3602, such as drivers, sensor circuitry, etc., to control the operation of the LEDs 3410 and sensors 3414 may be coupled to the outer surface of the top panel 3495 as illustrated in FIGS. 36-38.

Additionally, the linear light module 3402 may include slots 3802 (shown in FIGS. 40 and 41) that are formed in the side flanges 3491 and/or the side panel 3496. The slots 3802 may be configured to rotatably couple spring mounting clips 3416 to the secondary housing 3404 as illustrated in FIGS. 40 and 41. Torsion springs 206 are attached to the spring mounting clips 3416. In particular, the spring mounting clips 3416 and the torsion springs 206 attached thereto are configured to swivel between a first position shown in FIGS. 36-38 where the swivel clips 3416 and the torsion springs 206 attached thereto are substantially parallel to the side flanges 3491 (or the lens 3412) of the linear light module 3402 and a second position shown in FIG. 39 where the swivel clips 3416 and the torsion springs 206 attached thereto are substantially perpendicular to the side flanges 3491 (or the lens 3412) of the linear light module 3402.

Figure 23:
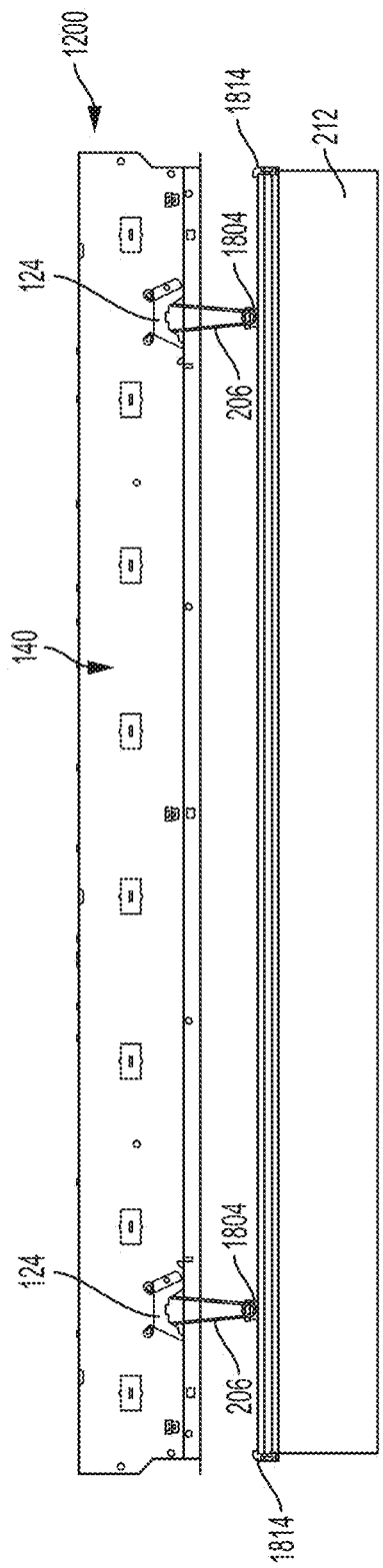
FIG. 23 illustrates a cross-section view of an example edgelit recessed luminaire with the torsion springs in an open position supporting the light engine of FIG. 18 in the housing of FIGS. 12 and 13, in accordance with example embodiments of the present disclosure.
Figure 39:
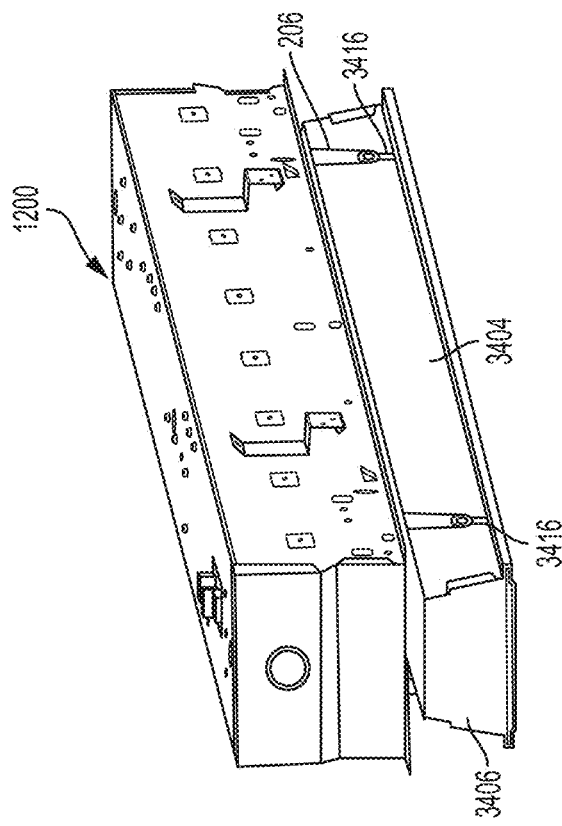

The coupling of the linear light module 3402 to the housing 1200 may be substantially similar to the quick connect and disconnect mechanism described above in association with coupling the light engine 200 (or 1800) to the housing as illustrated in FIGS. 5-6, 23, and/or 25-28. In particular, initially, the torsion springs 206 attached to one side flange 3491 of the linear light module 3402 may be coupled to the torsion spring receivers (120 or 1213) or HD spring receivers 124 of the housing 1200 as illustrated in FIGS. 36-38. Since the torsion springs 206 are coupled to the linear lighting module 3402 using rotatably coupled spring mounting clips 3416, when the torsion springs 206 attached to one side flange 3491 of the linear light module 3402 are coupled to the housing 1200, the linear light module 3402 swivels down and is suspended from the housing 1200 such that it is substantially perpendicular to the housing 1200 as illustrated in FIGS. 36-38. Then, the torsion springs 206 on the opposite side flange 3491 of the linear light module 3402 may be coupled to torsion spring receivers (120 or 1213) or HD spring receivers 124 of the housing 1200 such that the linear light module 3402 is suspended from the housing 1200 as illustrated in FIG. 39 where the linear light module 3402 is substantially parallel to the housing 1200. Once in the position shown in FIG. 39, the linear light module 3402 may be pushed in towards the housing 1200 to close an access to the cavity 140 formed by the housing 1200 and to couple the linear light module 3402 to the housing 1200 as illustrated in FIG. 34. When the linear light module 3402 is pushed in towards the housing 1200, the bottom edge of the HD spring receivers 124 may operate as a stop mechanism to prevent over-insertion of the linear light module 3402 into the housing 1200. However, in other example embodiments, the modular torsion spring receivers 1213 or integral torsion spring receivers 120 may include a stop tab 4304 to prevent over insertion of the linear light module 3402 into the housing 1200.

When the recessed module 3400 is mounted in a T-grid frame 802, the linear light module 3402 may be flush with the bottom surface of the T-grid members (801, 803) as illustrated in FIG. 42. The bottom surface of the linear light module's side flanges may be marked with indented arrows 4202 where the installer may have to insert a screwdriver to provide leverage to pull out the linear light module 3402 from the flush mount position in the T-grid 802 to access the electrical components or wiring disposed in the cavity 140 formed by the housing 1200.

Edgelit Recessed Luminaires Having a Housing without Modular Torsion Spring Receivers FIGS. 1-10 illustrate a housing 100 having torsion spring receivers 120 that are stamped into the side panel 110 of the housing 100 and FIGS. 12-14, 16-17, 23, 25-30, 33, and 36-39 illustrate a housing 1200 that has knockouts 1220 that may be detached from the housing 1200 to receive a modular torsion spring receiver 1213. However, one of ordinary skill in the art can understand and appreciate that in other example embodiments, the edgelit recessed luminaire may not include modular torsion spring receivers 120 that are stamped into the side panel 110 or modular torsion spring receivers 1213 that are disposed in openings formed by detaching the knockouts 1220 without departing from a broader scope of the present disclosure. For example, as illustrated in FIGS. 44-47 and 49-51, the housing 4400 of the edgelit recessed luminaire may only include the one or more HD spring receivers 124 that are coupled to and disposed on the inside surface of the side panel 110 of the housing 4400. Accordingly, for the sake of brevity and to avoid repetition, only those features of the housing 4400 that are different from housing 100 of FIG. 1 and housing 1200 of FIG. 12 will be discussed in association with FIGS. 44-51.

Figure 47:
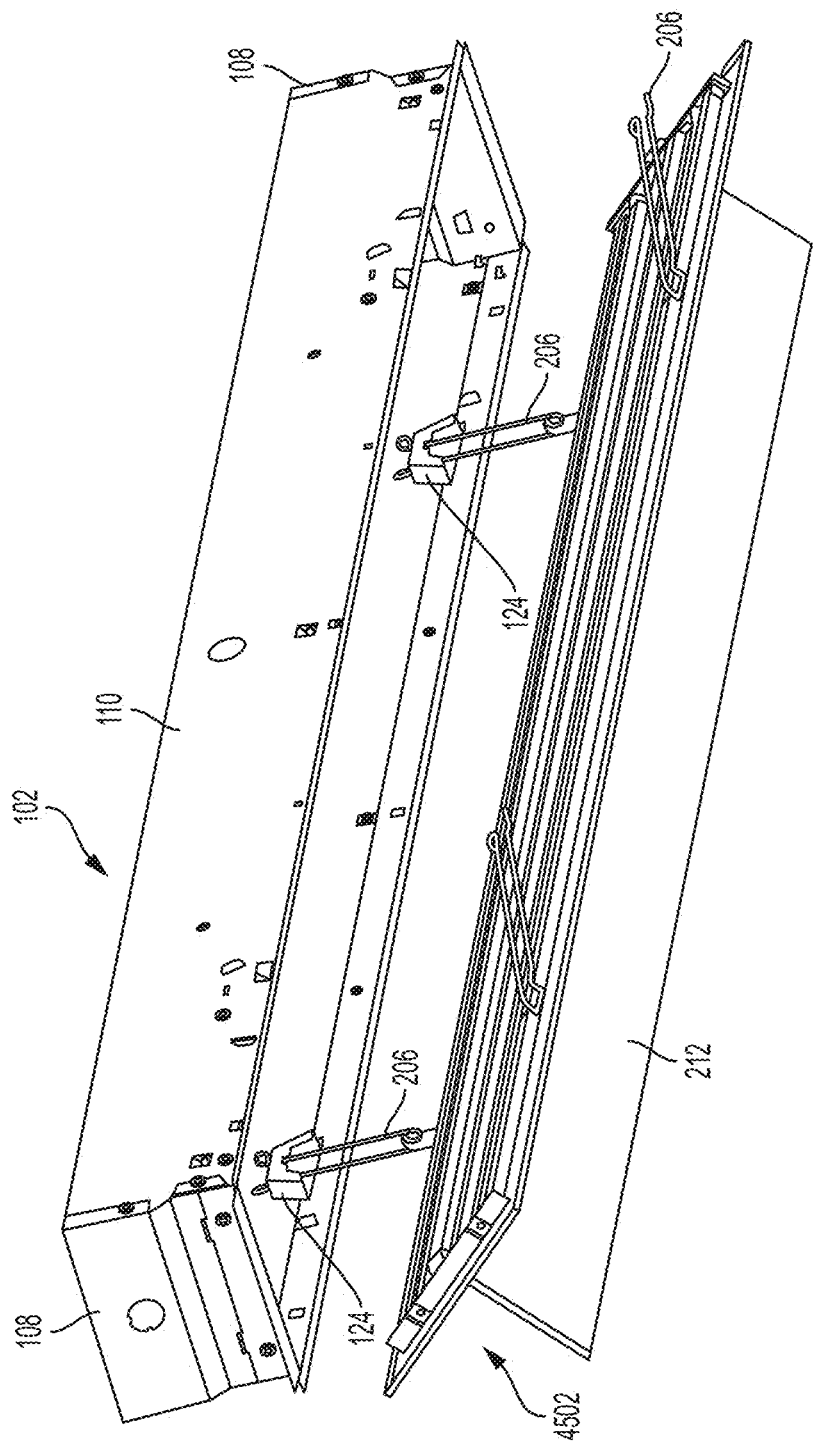
Figure 48:
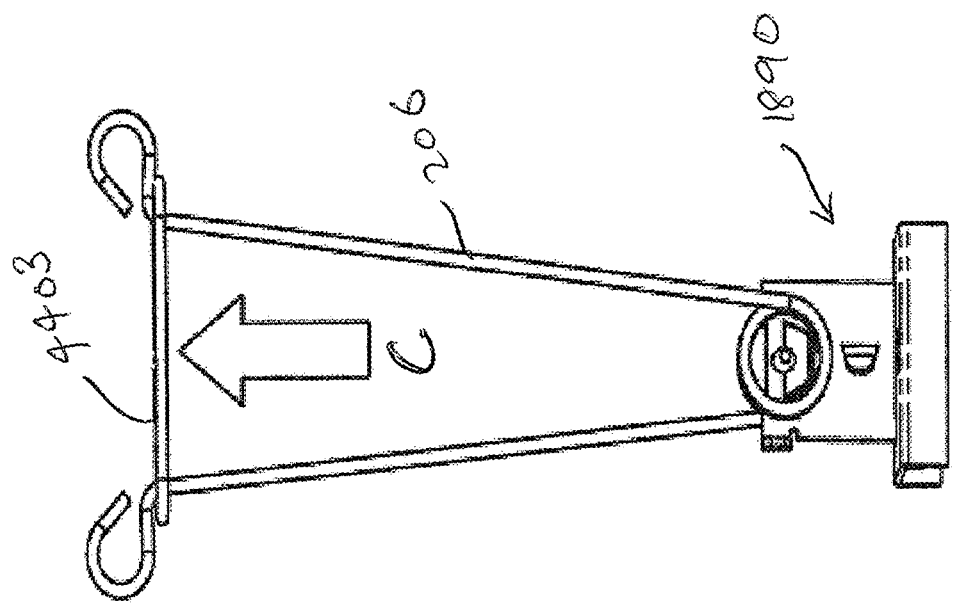
FIG. 48 illustrates a swivel spring mount of the light engine with a torsion spring assembly mounted thereon and having a spring assist loop, in accordance with example embodiments of the present disclosure.
Figure 49:
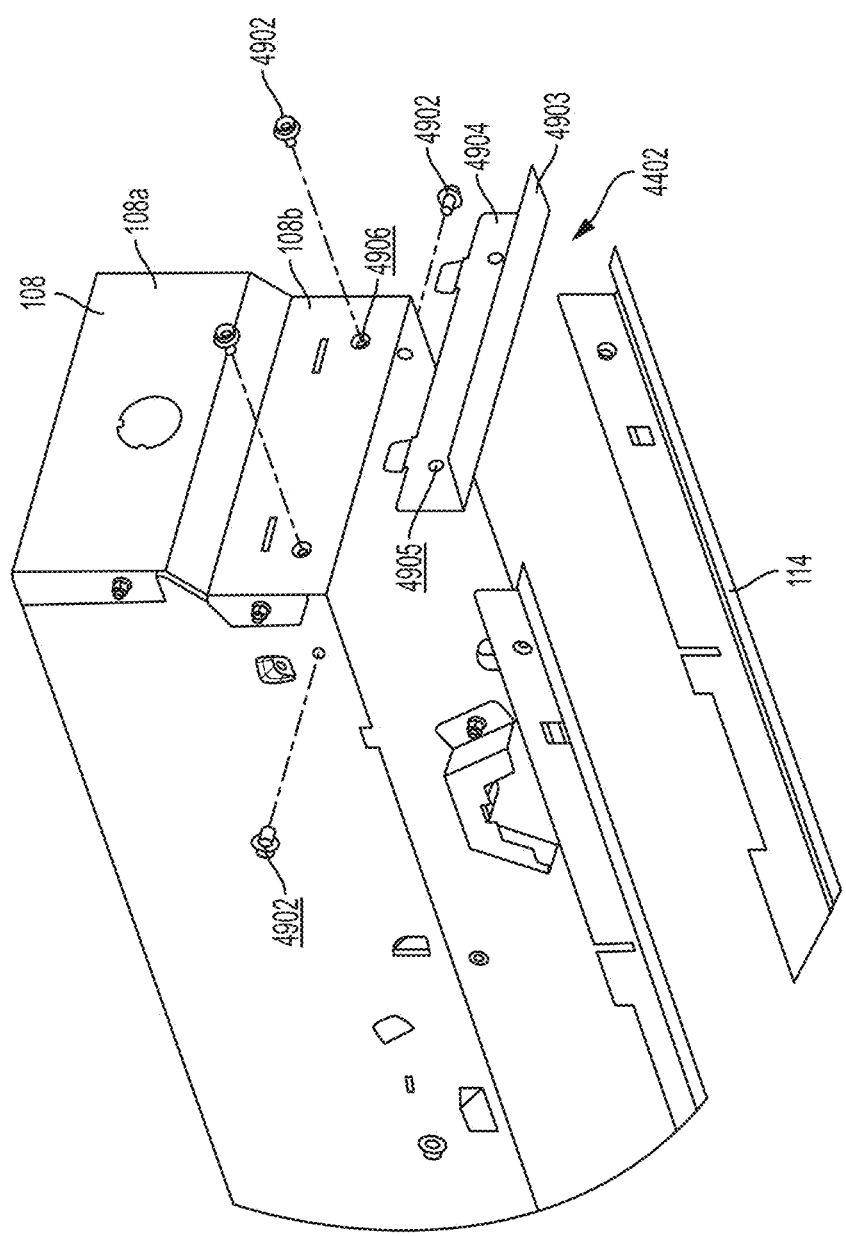
FIG. 49 illustrates an endplate flange being attached to the endplate for an example drywall installation of the edgelit recessed luminaire, in accordance with example embodiments of the present disclosure.

Referring to FIGS. 44-49, in addition to the HD spring receivers 124, the housing 4400 may include an endplate flange 4402 that may be attached to the lower portion 108b of the notched end panel 108 of the housing 4400 using fasteners 4902 as illustrated in FIG. 49. Even though the notched end panel 108 may have an end flange 112 (shown in FIG. 12) that is integral to the notched end panel 108, in some drywall installations, after the installation a gap may exist between the drywall ceiling and the flange 112 of the notched end panel 108 which may be unsightly. To ensure that such gaps are covered and are not visible after installation, the endplate flange 4402 with a wider flange may be attached to the notched end panel 108. The endplate flange 4402 may include an attachment portion 4904 with coupling through apertures 4905, and a flange portion 4903. The flange portion 4903 may be wider than the flange 112 of the notched end panel 108. The endplate flange 4402 may be attached to the notched end panel 108 by aligning the coupling through apertures 4905 of the endplate flange 4402 with the apertures 4906 of the notched end panel 108. Further, the fasteners 4902 are passed through the aligned apertures to attach the endplate flange 4402 to the notched end panel 108.

Even though FIGS. 44-51 do not illustrate housing 4400 as having a drywall clamp 104 and a clamp fastener 106, one of ordinary skill in the art can understand that the housing 4400 may include the drywall clamp 104 and a clamp fastener 106 for drywall installations without departing from a broader scope of the present disclosure.

Figure 45:
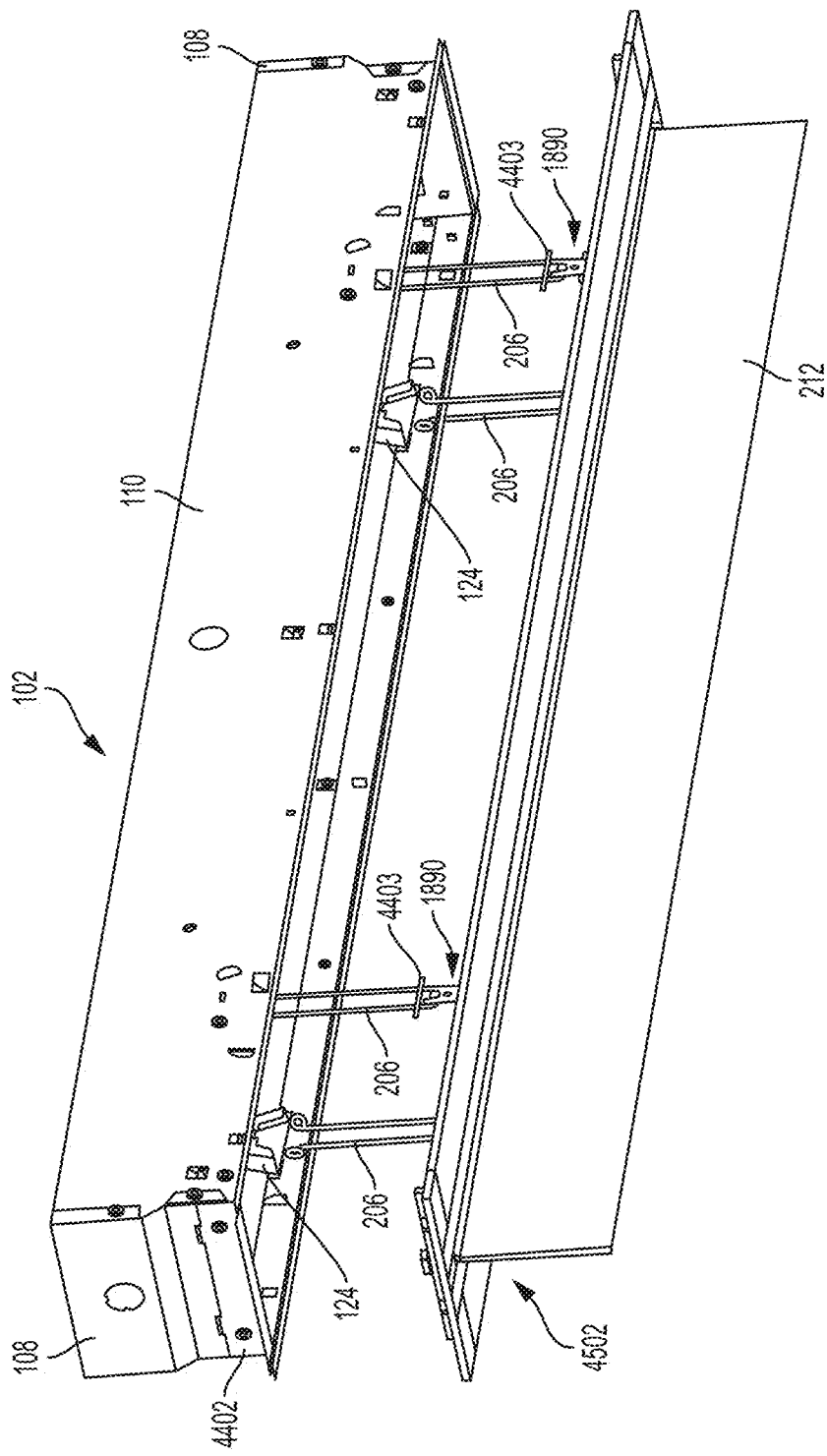
FIGS. 45-47 illustrate how a light engine is coupled to the housing of FIG. 44 using a quick connect and disconnect method, in accordance with example embodiments of the present disclosure.
Figure 46:
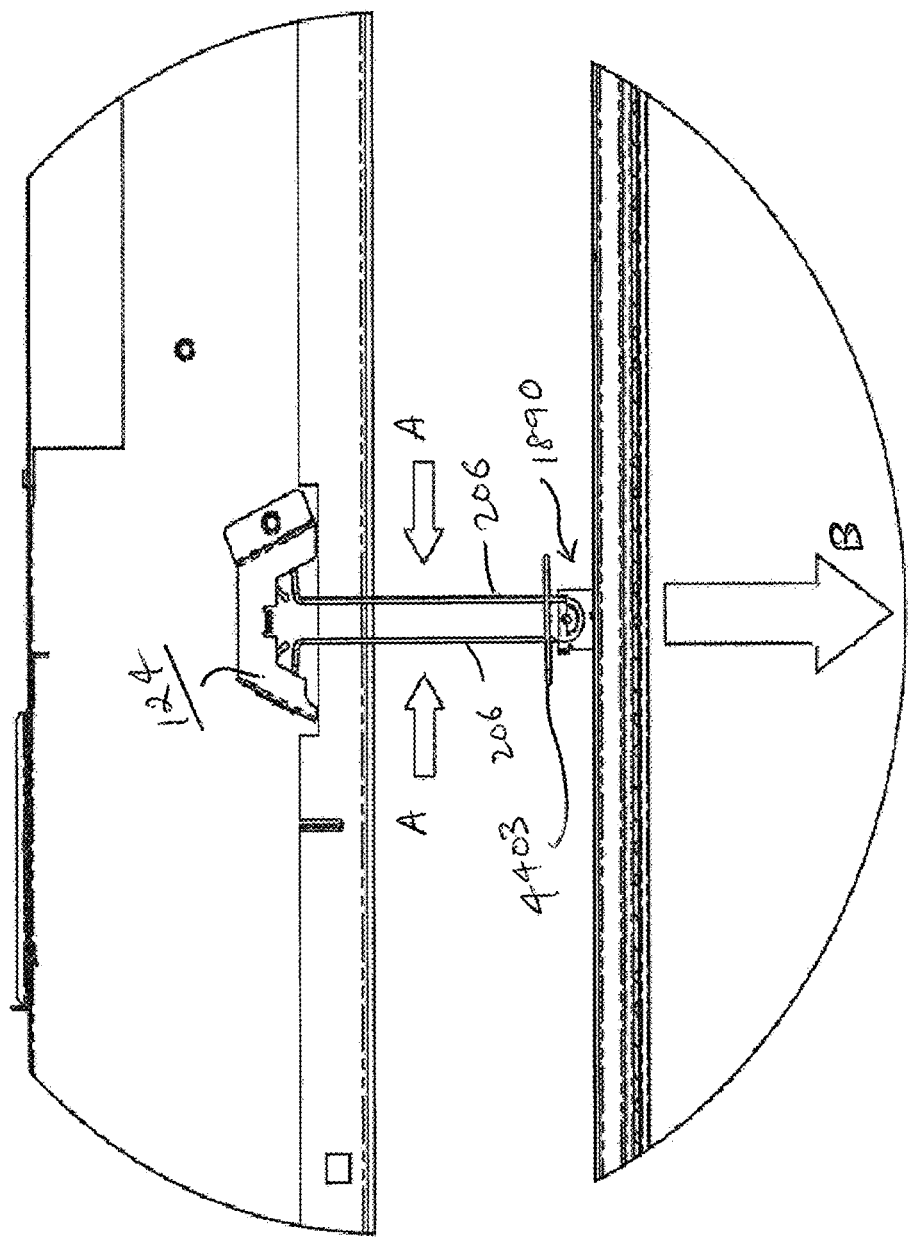

Referring to FIGS. 45-47, the HD spring receivers 124 may be configured to removably couple a light engine 4502 to the housing 4400 using torsion springs 206 that are coupled to the light engine 4502. As illustrated in FIG. 48, the torsion spring assembly may include a torsion spring 206 that is attached to a swivel mount 1809 (illustrated in and described above in association with FIG. 18) and a spring assist loop 4403. The torsion spring 206 may include two arms with a hook at the end of each arm, and the spring assist loop 4403 may be disposed around the two arms of the torsion spring 206 below the hook ends. The spring assist loop 4403 can slide along the arms of the torsion spring 206, e.g., from below the hook ends towards the opposite end of the arms of the torsion spring 206.

Initially, the torsion spring receivers 206 may be aligned with the respective HD spring receivers 124 as illustrated in FIG. 45. Responsively, as illustrated in FIG. 46, the installer may pinch the arms of torsion spring 206 together in the direction A. When the arms are pinched together, the spring assist loop 4403 may slide down towards the end of the torsion spring that is opposite to the hooked ends. Then, as illustrated in FIGS. 47 and 48, the torsion springs 206 along one side of the light engine 4502 are pushed upwards such that the hook ends of the torsion springs 206 pass through an opening on the top of the respective HD spring receivers 124 and engage the top edge of the HD spring receivers 124. Further, the spring assist loop 4403 is pushed upwards in the direction C towards the hook end as shown in FIG. 48 such that the spring assist loop 4403 holds the arms of the torsion spring 206 from reverting back to their expanded state and pulling the light engine 4502 upwards. Without the spring assist loop 4403, when the torsion springs 206 are inserted in the HD spring receivers 124, the torsion springs 206 tend to spring back to their default expanded state which in turn pulls the light engine upwards. The spring assist loop 4403 prevents the torsion springs 206 from reverting back to their expanded state when the spring assist loop 4403 is disposed adjacent the hook ends of the torsion springs as illustrated in FIG. 48. The spring assist loop 4403 provides the installer additional control in the coupling or decoupling of the light engine 4502 with the housing 4400.

Once the torsion springs 206 along one edge of the light engine 4502 are passed through the corresponding HD spring receivers 124 and the spring assist loop 4403 has been positioned adjacent the hook ends of the torsion springs 206, the light engine 4502 may be suspended from the housing as described above in association with FIGS. 5-6. When the light engine 4500 is suspended from the housing 4400, an installer may have access to the cavity 140 formed by the housing 4400 and the electrical components and/or wiring disposed in the housing 4400. Depending on the type of torsion spring mounting bracket that is used to couple the torsion springs 206 to the light engine 4502, the light engine 4502 may swivel when it is suspended from the housing 4400 to provide better access to the cavity 140 formed by the housing 4400 and the electrical components and/or wiring disposed in the housing 4400. For example, the light engine 4502 that is coupled to the torsion springs 206 using the two-part swivel torsion spring bracket 1890 may swivel by approximately 45 degrees (or more or less in other examples) when the torsion springs 206 along one long edge of the light engine 4502 are coupled to the HD spring receivers 124 on the corresponding side panel 110 of the housing 4400, thereby providing better access to the cavity 140 formed by the housing without any interference of the torsion springs 206 coupled to the opposite long edge of the light engine 4502.

Once the installer has made the electrical connections, the installer may insert the torsion springs 206 on the opposite long edge of the light engine 4502 into the corresponding HD spring receivers 124 and adjust the spring assist loops 4403 of the torsion springs 206 as described above. Then, the installer may push the light engine 4502 up towards the housing 4400 to close the access to the cavity 140. As the light engine 4502 is pushed upwards, the spring assist loop 4403 of each torsion spring 206 may slide down the arms of the respective torsion spring 206 towards the opposite end of the torsion spring 206. To access the cavity 140 of the housing 4400, the light engine 4502 may be pulled down in the direction B as illustrated in FIG. 46.

Figure 44:
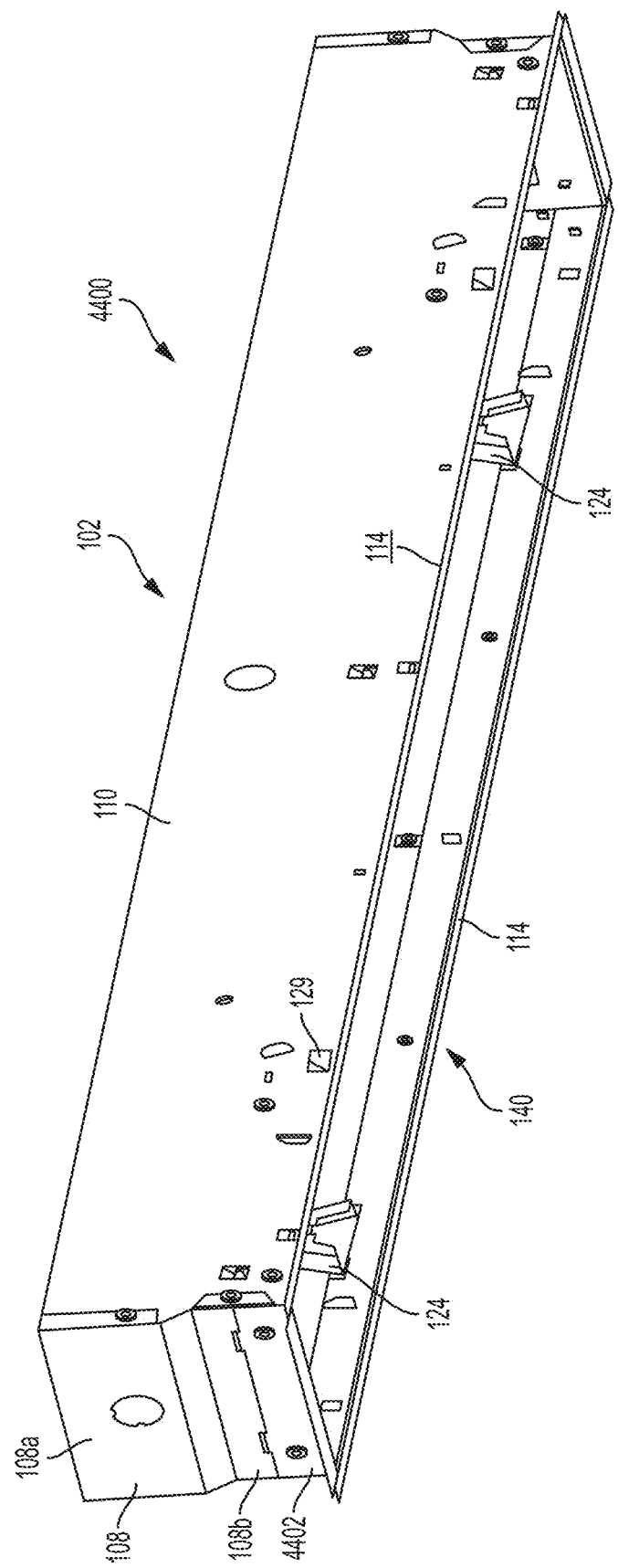
FIG. 44 illustrates a perspective view of yet another example housing of an edgelit recessed luminaire, in accordance with example embodiments of the present disclosure.
Figure 50:
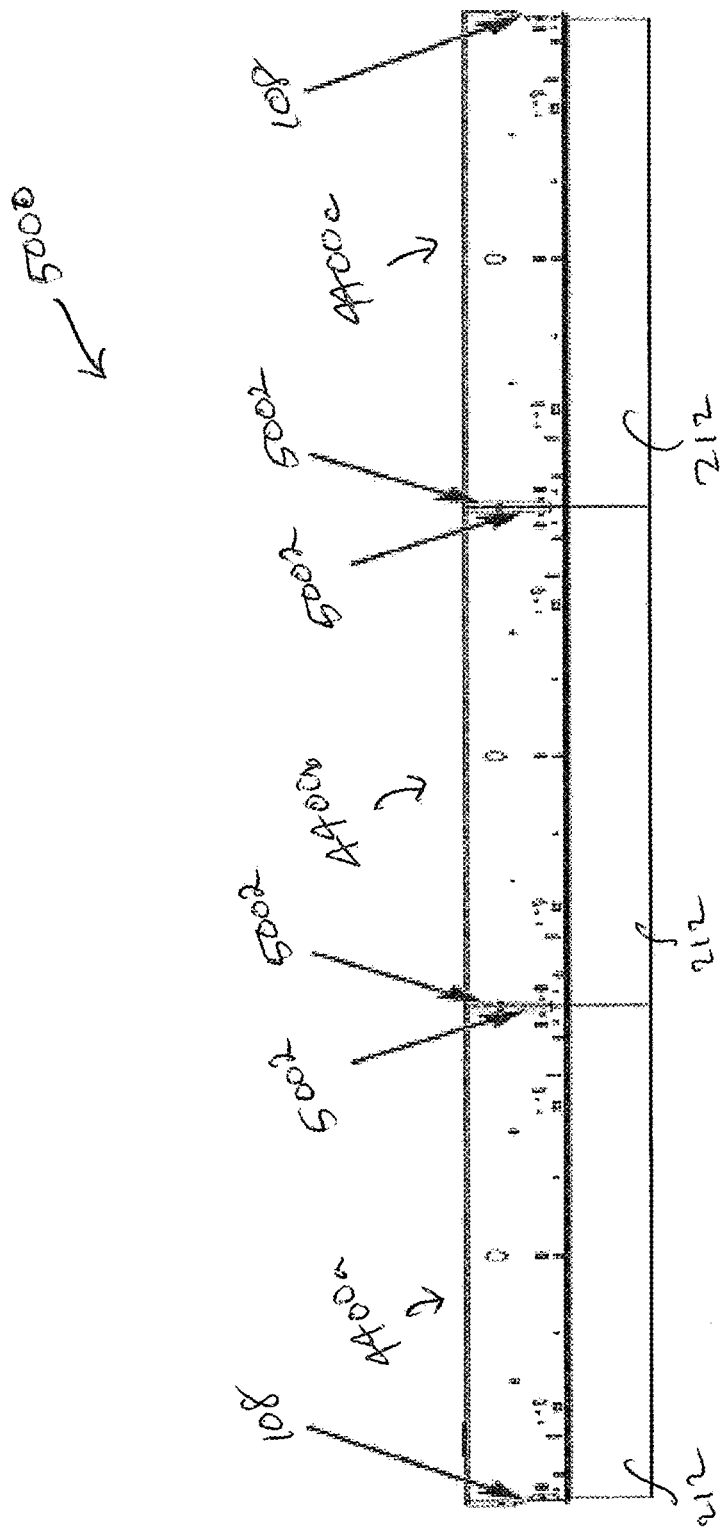
FIG. 50 illustrates another example row mounting of edgelit luminaires in an example drywall installation, in accordance with example embodiments of the present disclosure.
Figure 51:
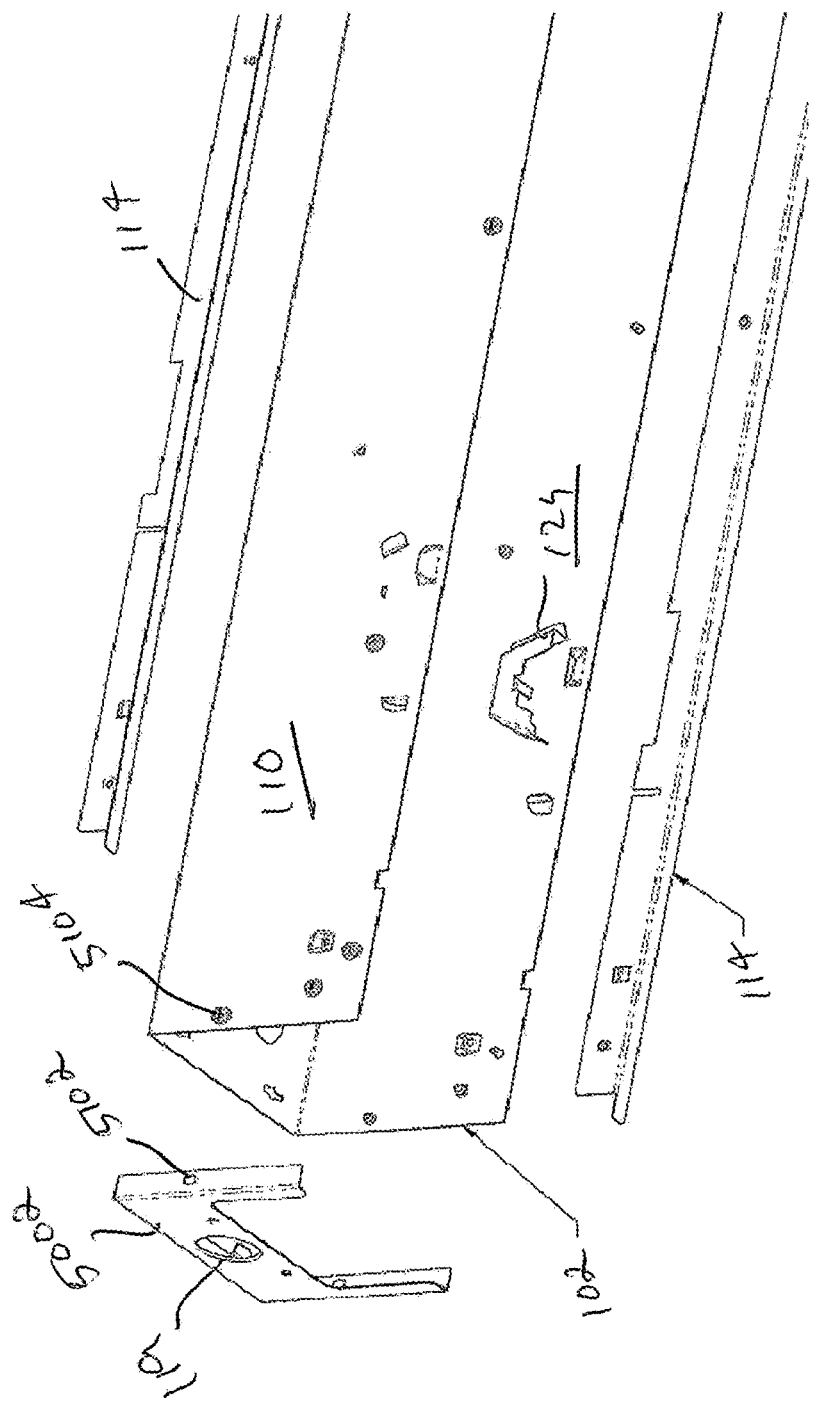
FIG. 51 illustrates a row mount end plate being attached to the example housing of FIG. 44 for an example row mounting installation, in accordance with example embodiments of the present disclosure.

Even though FIG. 44 illustrates one edgelit recessed luminaire, one of ordinary skill in the art can understand that the edgelit recessed luminaires described herein are configured for continuous row mounting, if desired. For example, more than one edgelit recessed luminaire (4400a, 4400b, 4400c) may be aligned or coupled end to end as illustrated in FIG. 50. In one example embodiment, two edgelit recessed luminaires (4400a and 4400c) shown in the example embodiment of FIG. 50, may be end segments while the edgelit recessed luminaire 4400b may be a middle segment. The end segments (4400a and 4400c) may have a notched end panel 108 at the outer ends that are farthest away from each other while the inner ends may have a flat end panel 5002. Similarly, both the end panels of the middle segment 4400b may be flat end panels 5002. As illustrated in FIG. 51, each flat end panel 5002 has knockouts 119 for routing wires between the row mounted edgelit recessed luminaires. Further, the flat end panels 5002 may include apertures 5102 that are configured to be aligned with apertures 5104 of the housing 4400 to receive fasteners therethrough to attach the flat end panels 5002 to the housing 4400.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. An edgelit recessed luminaire comprising:
   a housing that defines an inner cavity and has a pair of side panels,
      wherein each side panel comprises one or more torsion spring receivers; and
   a light engine that is removably coupled to the housing and comprises:
      a heat sink assembly that defines a light source cavity and a waveguide cavity;
      a plurality of light emitting diodes (LEDs) disposed in the light source cavity;
      a waveguide that is disposed in the waveguide cavity such that light from the plurality of LEDs enters an edge of the waveguide and exits through at least one major surface of the waveguide; and
      a plurality of torsion springs that are coupled to the heat sink assembly of the light guide via torsion spring brackets,
         wherein the light engine is removably coupled to the housing using the torsion springs such that in an open position, the light engine is suspended from the housing via the torsion springs providing access to the inner cavity and in a closed position, the light engine covers the inner cavity of the housing.

2. The edgelit recessed luminaire of claim 1, further comprising an end flange that is removably coupled to the housing, wherein the end flange is configured to mount the housing in a T-grid frame of a T-grid ceiling or to retrofit the housing in a drywall ceiling.

3. The edgelit recessed luminaire of claim 1, further comprising a pair of drywall clamps disposed on a top surface of the housing and configured to mount the housing in a drywall ceiling.

4. The edgelit recessed luminaire of claim 1, wherein each side panel of the housing further comprises one or more mounting features that are configured to fasten the housing to rafters or joists in a ceiling.

5. The edgelit recessed luminaire of claim 1, wherein the torsion spring receivers are heavy duty spring receivers that are disposed on an inner surface of each side panel of the housing, and wherein each torsion spring receiver comprises angled edges that define an opening at a top of the torsion spring receiver, wherein the angled edges of the torsion spring receiver are configured to guide a respective torsion spring of the plurality of torsion springs towards the opening on the top of the torsion spring receiver.

6. The edgelit recessed luminaire of claim 1, wherein the pair of side panels comprise additional spring receivers for installation of alternate light fixtures, sensors, air vents, or any other modular accessories.

7. The edgelit recessed luminaire of claim 1, wherein each side panel of the housing further comprises one or more earthquake clips that are installed to lock the housing to a T-grid frame in a T-grid ceiling.

8. The edgelit recessed luminaire of claim 1, wherein the housing further comprises a top surface and a pair of end panels, wherein the top surface, the pair of end panels, and the pair of side panels are configured such that they define a substantially U-shaped cross-sectional profile, and wherein the inner cavity is configured to house one or more electrical components associated with the edgelit recessed luminaire.

9. The edgelit recessed luminaire of claim 1, wherein the edgelit recessed luminaire is configured to be end-to-end row mounted with another edgelit recessed luminaire along a lateral end of the edgelit recessed luminaire.

10. The edgelit recessed luminaire of claim 1, wherein each torsion spring includes two arms that end in a hook shaped structure at one end, and wherein a spring assist loop is disposed around the two arms of the torsion spring and configured to slide along the two arms.

11. The edgelit recessed luminaire of claim 1, wherein each torsion spring bracket is pivotally coupled to the heat sink assembly of the light engine.

12. An edgelit recessed luminaire comprising:
   a housing that defines an inner cavity and has a pair of side panels,
      wherein each side panel comprises a plurality of torsion spring receivers; and
   a linear light module that is removably coupled to the housing and comprises:
      a secondary housing that defines a cavity with an open side;
      a plurality of light emitting diodes (LEDs) disposed in the cavity defined by the secondary housing;
      a lens coupled to the secondary housing and disposed over the plurality of LEDs such that it covers the open side of the cavity defined by the secondary housing and such that light emitted by the plurality of LEDs passes through the lens towards an illumination area; and
      a plurality of torsion springs that are coupled to the secondary housing via torsion spring clips, wherein the torsion spring clips are rotatably coupled to the secondary housing,
         wherein the linear light module is removably coupled to the housing using the torsion springs such that in an open position, the linear light module is suspended from the housing via the torsion springs providing access to the inner cavity defined by the housing and in a closed position, the linear light module covers the inner cavity defined by the housing.

13. The edgelit recessed luminaire of claim 12, further comprising an end flange that is removably coupled to the housing, wherein the end flange is configured to mount the housing in a T-grid frame of a T-grid ceiling or to retrofit the housing in a drywall ceiling.

14. The edgelit recessed luminaire of claim 12, further comprising a pair of drywall clamps disposed on a top surface of the housing and configured to mount the housing in a drywall ceiling.

15. The edgelit recessed luminaire of claim 12, wherein each side panel of the housing further comprises one or more mounting features that are configured to fasten the housing to rafters or joists in a ceiling.

16. The edgelit recessed luminaire of claim 12, wherein each torsion spring includes two arms that end in a hook shaped structure at one end, and wherein a spring assist loop is disposed around the two arms of the torsion spring and configured to slide along the two arms.

17. The edgelit recessed luminaire of claim 12, wherein the plurality of torsion spring receivers are heavy duty spring receivers that are disposed on an inner surface of each side panel of the housing, and wherein each torsion spring receiver comprises angled edges that define an opening at a top of the torsion spring receiver, wherein the angled edges of the torsion spring receiver are configured to guide a respective torsion spring of the plurality of torsion springs towards the opening on the top of the torsion spring receiver.

18. The edgelit recessed luminaire of claim 12, wherein the housing further comprises a top surface and a pair of end panels, wherein the top surface, the pair of end panels, and the pair of side panels are configured such that they define a substantially U-shaped cross-sectional profile, and wherein the inner cavity is configured to house one or more electrical components associated with the edgelit recessed luminaire.

19. The edgelit recessed luminaire of claim 12, further comprising an endplate flange that has a wide flange and is configured to be removably coupled to an end panel of the housing.

20. The edgelit recessed luminaire of claim 12, wherein the edgelit recessed luminaire is configured to be end-to-end row mounted with another edgelit recessed luminaire along a lateral end of the edgelit recessed luminaire.

* * * * *